INVENTOR
Otto Hermann
BY
Wood, Herron & Evans
ATTORNEYS

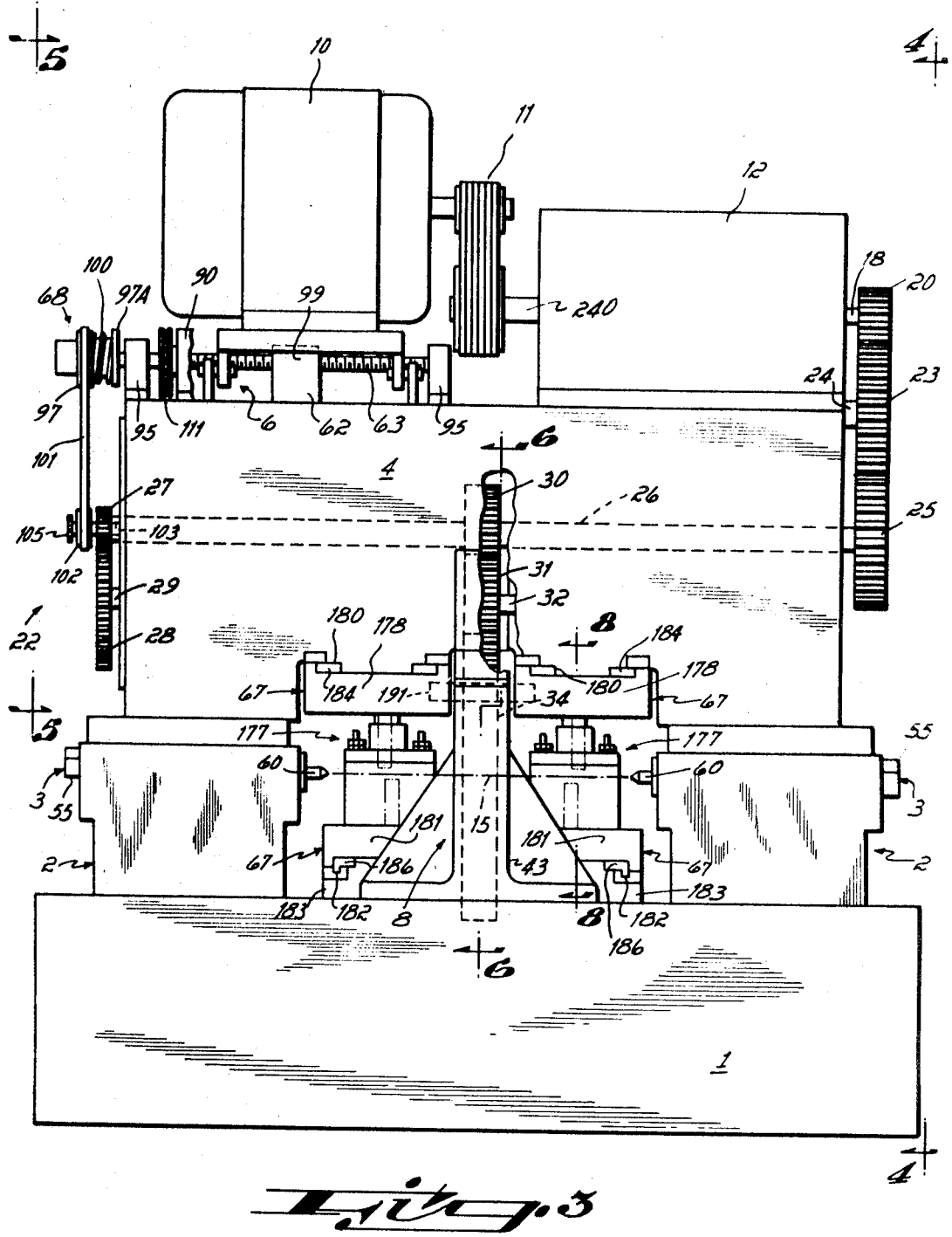

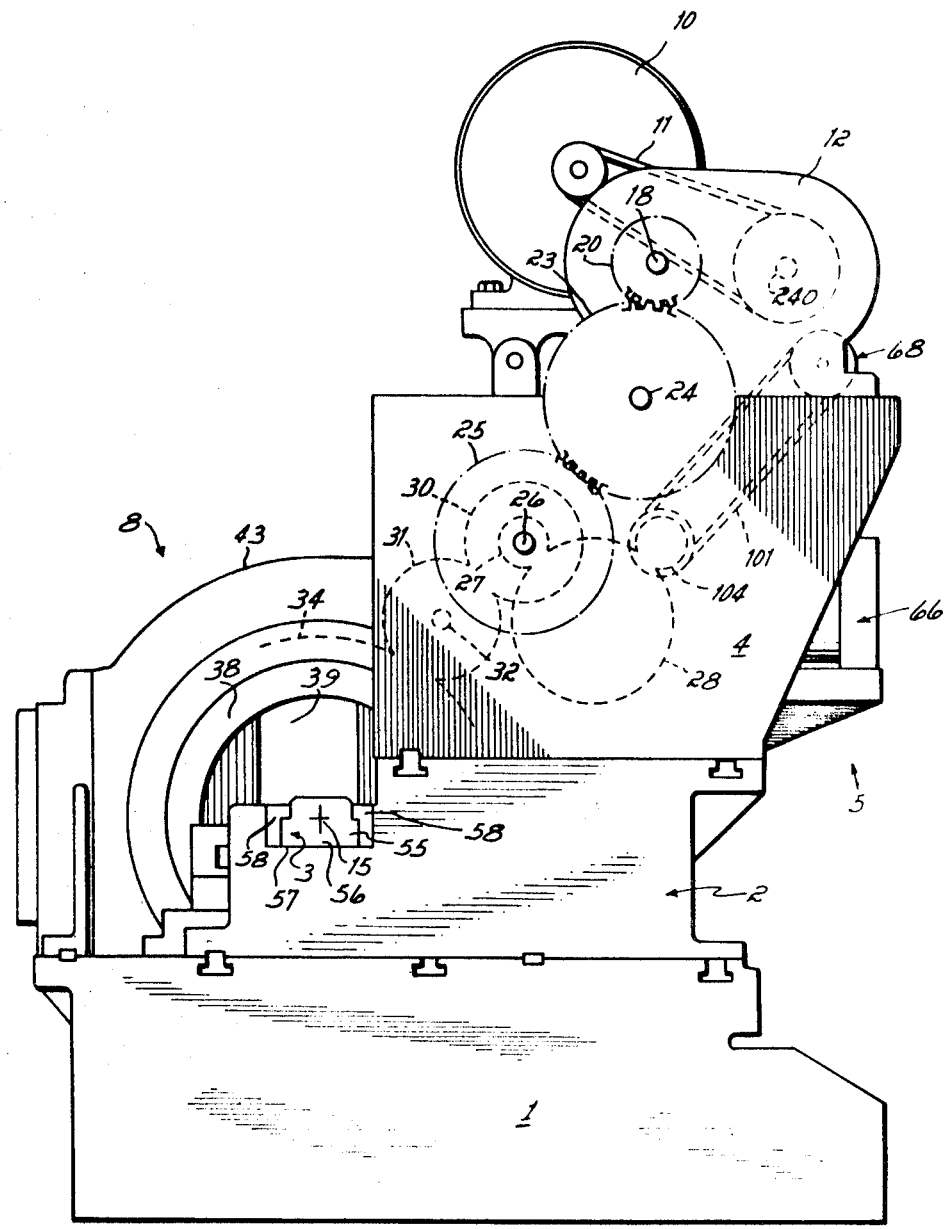

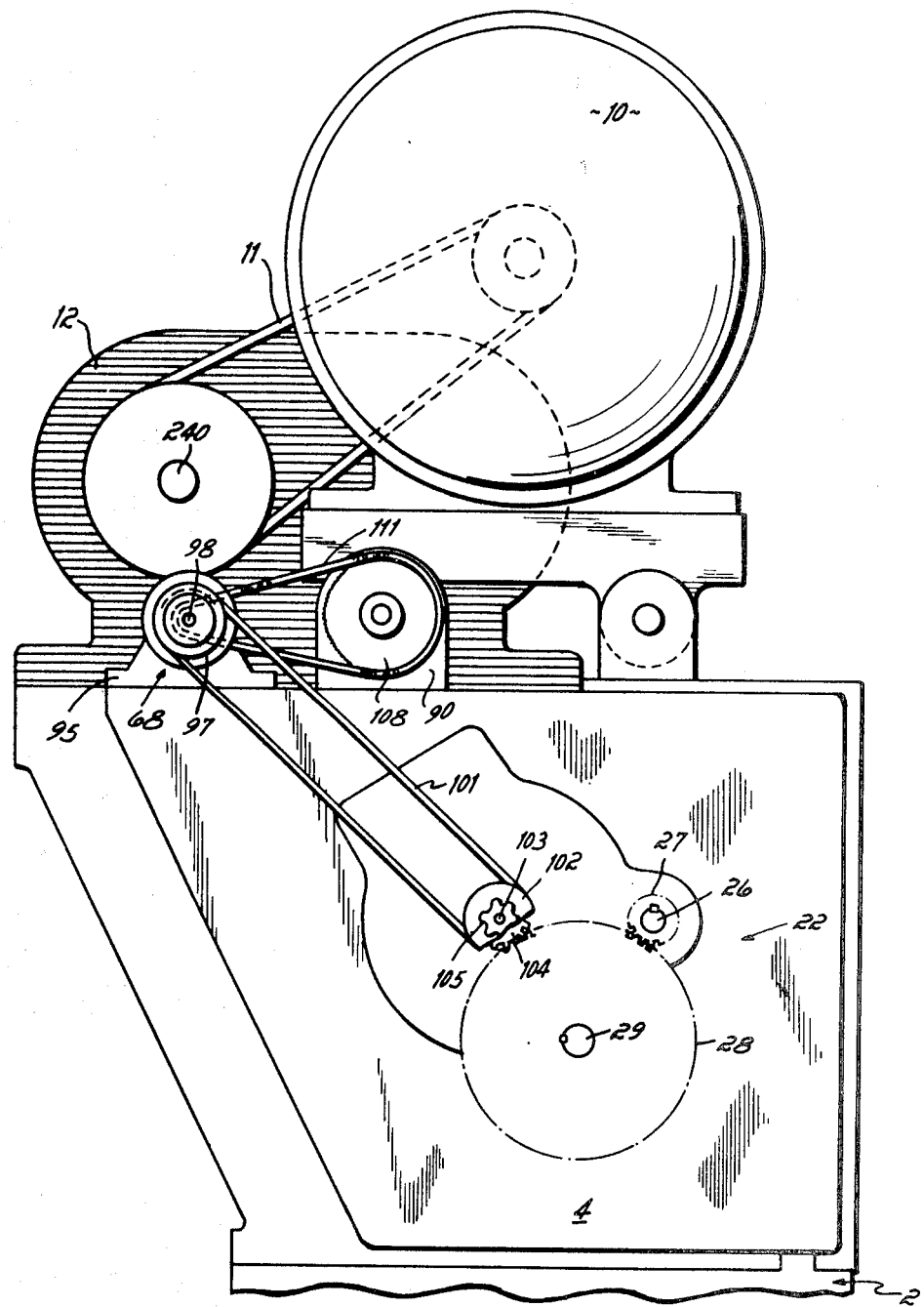

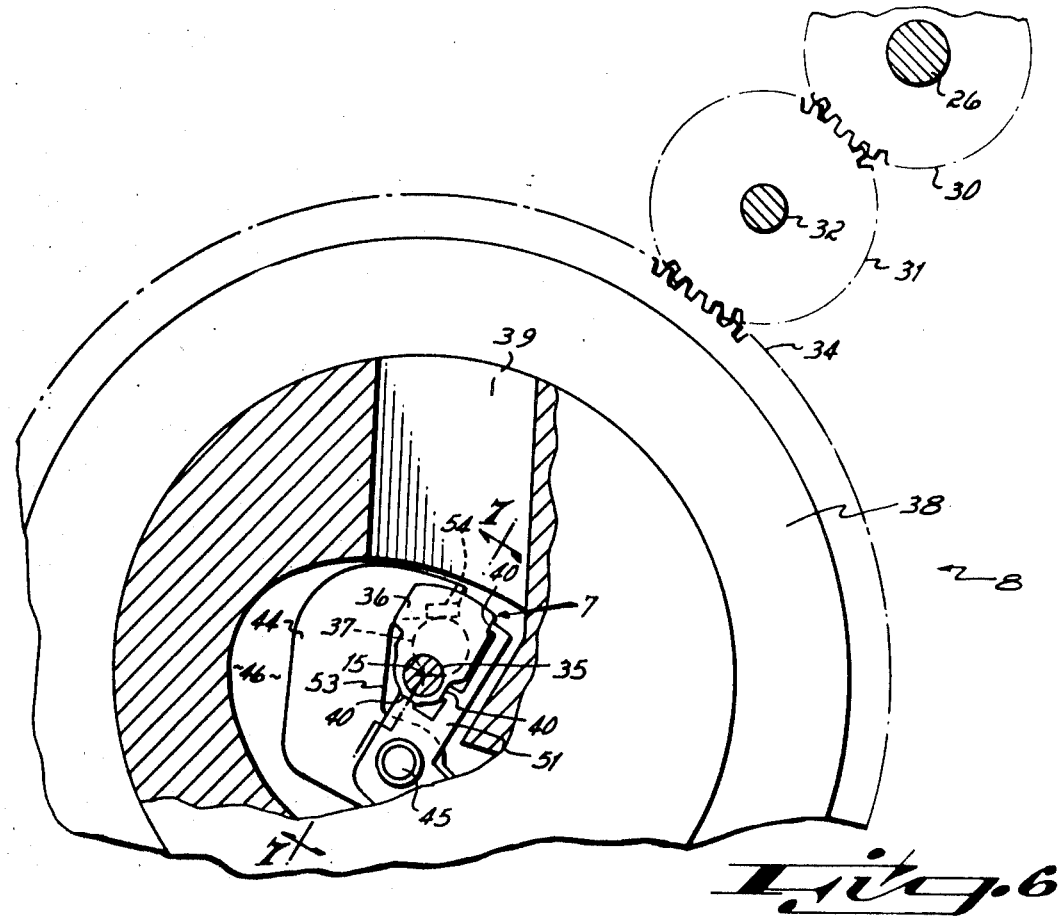
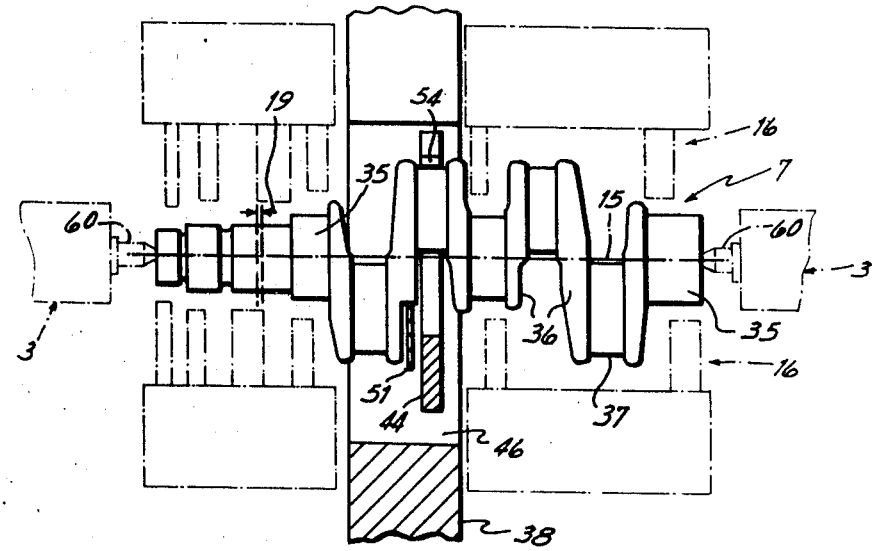

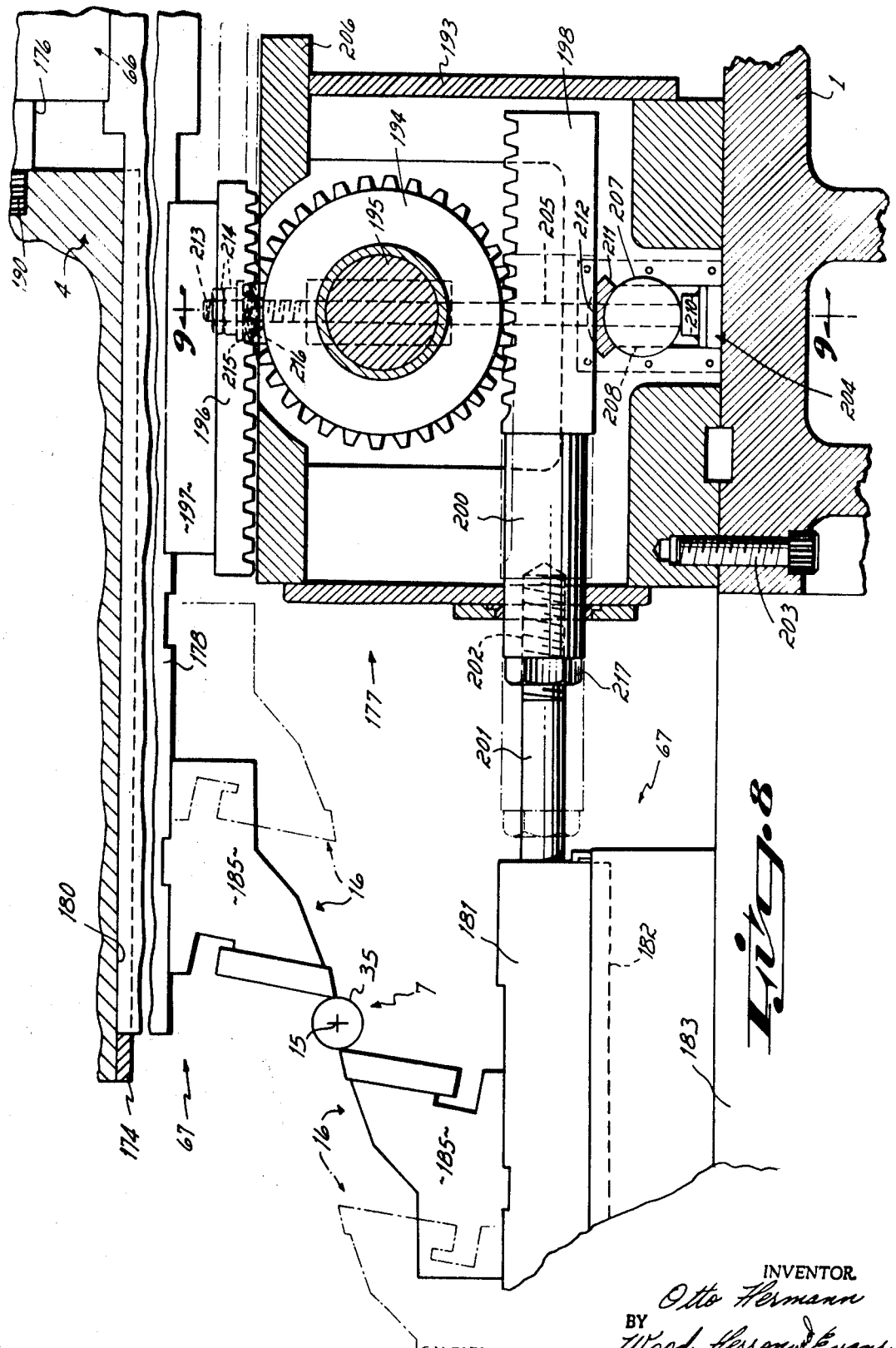

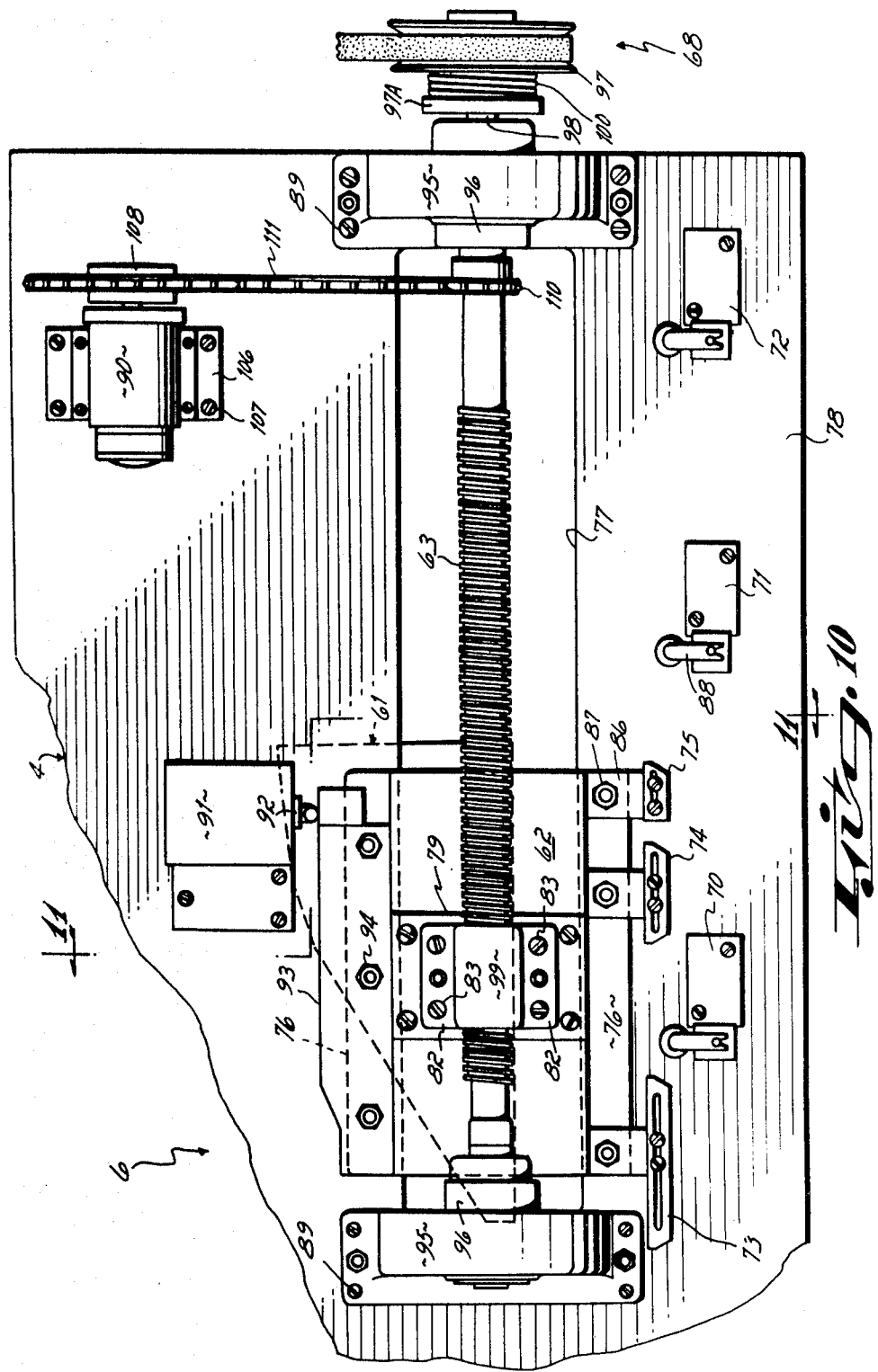

INVENTOR.
Otto Hermann
BY Wood, Herron & Evans
ATTORNEYS

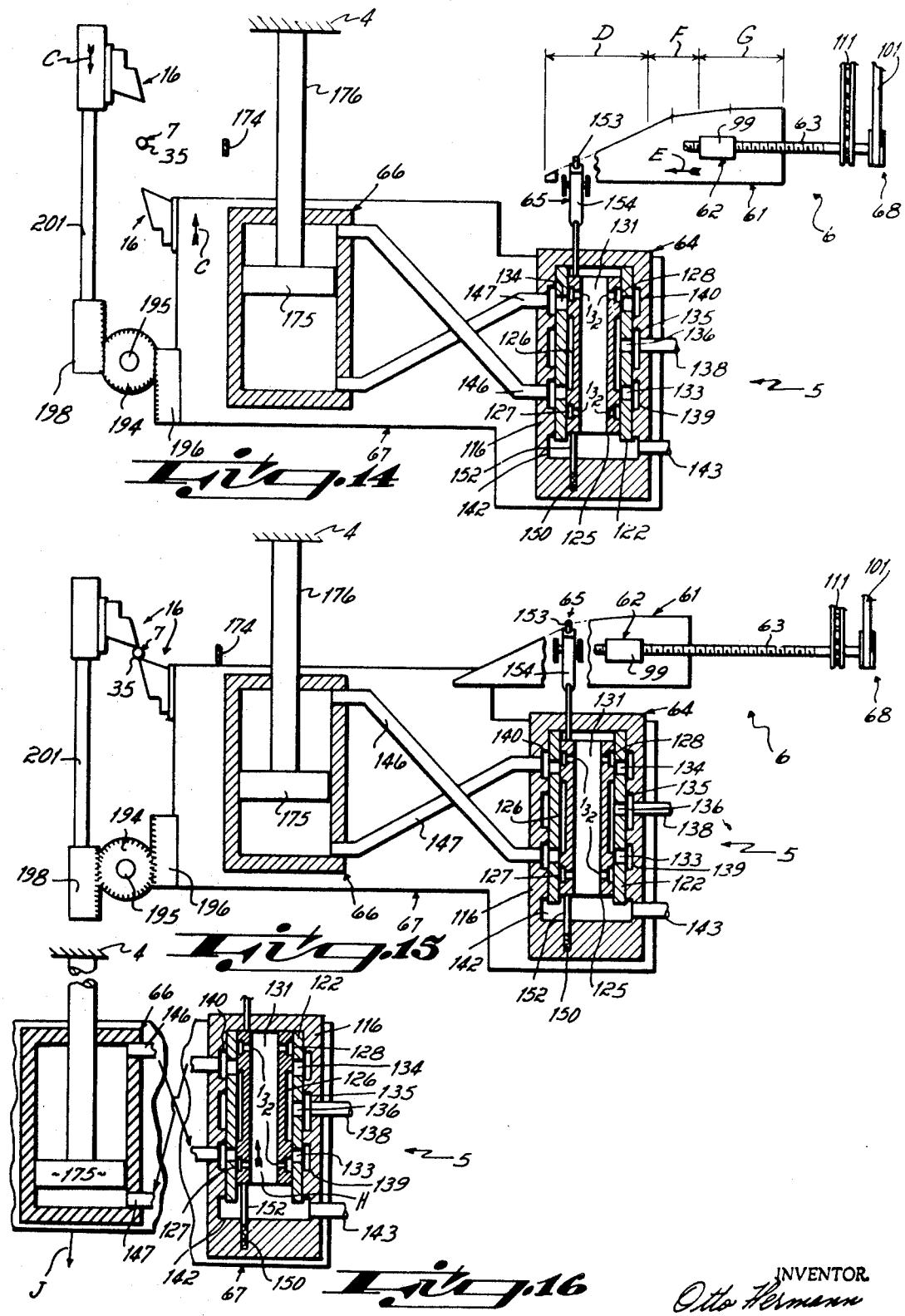

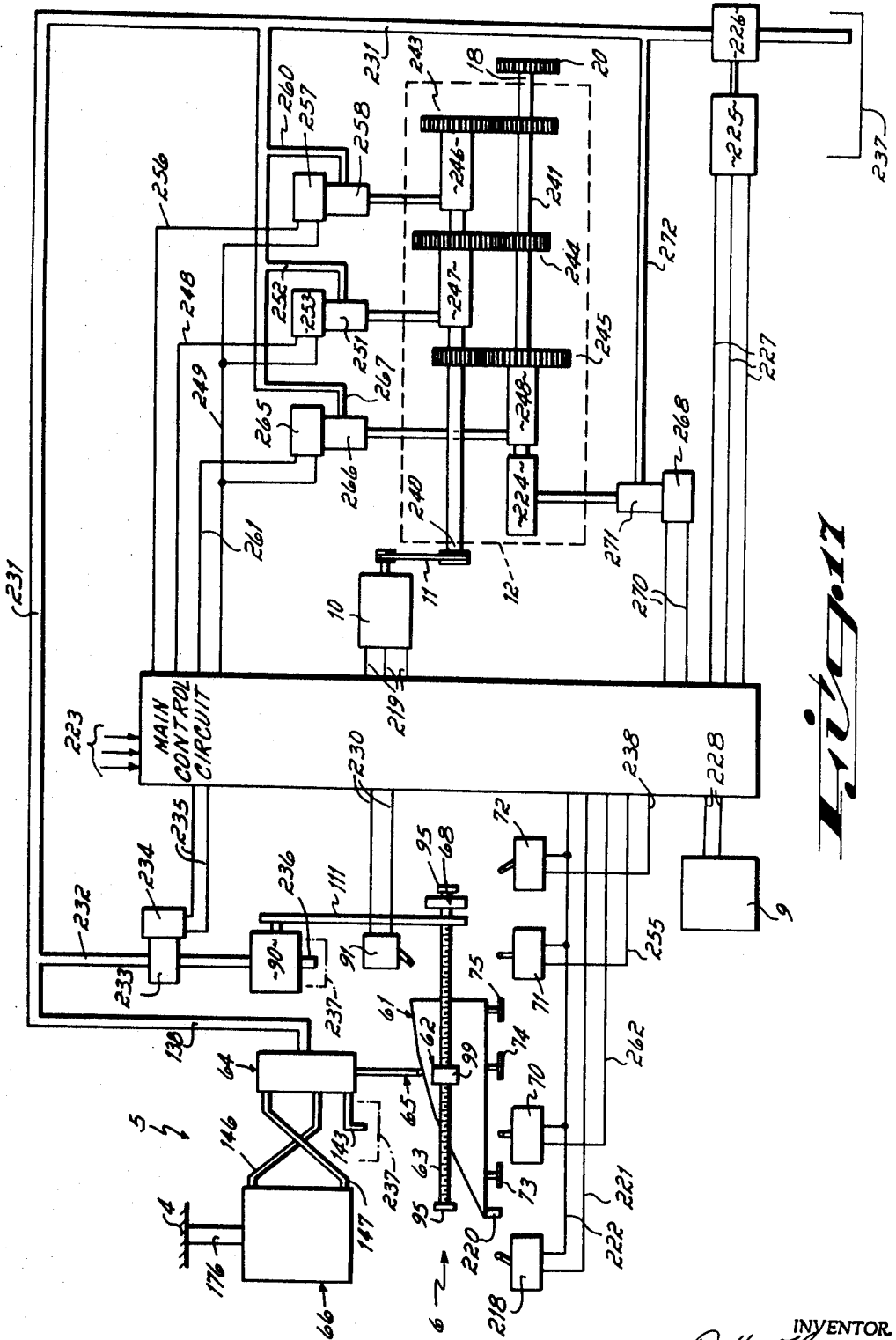

United States Patent Office 3,516,309
Patented June 23, 1970

3,516,309
TRACER CONTROLLED FEED MECHANISM FOR MACHINE TOOLS
Otto Hermann, Cincinnati, Ohio, assignor to The R. K. Le Blond Machine Tool Company, Cincinnati, Ohio, a corporation of Delaware
Filed Nov. 27, 1967, Ser. No. 685,864
Int. Cl. B23b 3/28
U.S. Cl. 82—14                9 Claims

ABSTRACT OF THE DISCLOSURE

The disclosure is directed to an apparatus for feeding the cutting tools of a machine tool relative to a workpiece in an automatic manner, utilizing a hydraulic tracer valve having a stylus which traces the profile of a moving template to generate the tool feed motion. The tool feed mechanism, which includes tool slides having opposed cutting tools, is actuated by a hydraulic cylinder interconnected with the tracer valve. The cylinder is mechanically connected to the tool slides and arranged to shift the tool slides and cutting tools, by servo action, along lines at right angles to the axis of work rotation in response to the deflections of the valve stylus as it traces the profile of the moving template.

BACKGROUND OF THE INVENTION

The tool feed apparatus of the invention is suitable for general utility in machine tools and is particularly suited for use in a lathe for cylindrical turning operations, such as a crankshaft lathe. The lathe selected to illustrate the invention includes opposed cutting tools, mounted upon opposed tool slides, the tools being presented to the main bearings of a crankshaft at opposite sides and fed automatically, under tracer control, toward and from the axis of rotation of the main crankshaft bearings. However, the hydraulic or fluid pressure tracer apparatus may also be utilized in feeding the cutting tools in a face turning operation and also in feeding the cutting tools of drilling machines, planers and machine tools generally which employ means for feeding the cutting tools relative to the work at a predetermined feed rate.

One of the primary objectives of the invention has been to provide a tracer controlled tool feed apparatus which provides precise control of the feed rate of the cutting tools, utilizing a simplified arrangement in which the stylus of a tracer valve is presented to the profile of a moving template to actuate a hydraulic feed cylinder which, by servo action, feeds the cutting tools in response to minute deflections of the stylus as developed by the slope of the template and its rate of movement.

According to this aspect of the invention, the moving template is connected to a screw shaft which in turn is in driving connection with a speed change transmission which rotates the workpiece. The arrangement is such that the rate of advancement of the template (and rate of tool feed ralative to the work axis) is correlated to the surface speed of the rotating workpiece.

Another objective of the invention has been to provide a tracer controlled apparatus in which the template is provided with a profile having slopes which vary in degree, whereby, in response to advancement of the template during the cutting cycle, the cutting tools may be fed from a retracted, non-cutting position at a rapid traverse rate to save time, and thereafter presented to the rotating workpiece at different rates of feed.

In the present disclosure, the apparatus provides advancement of the opposed cutting tools, at a rapid traverse rate, from a retracted non-cutting position toward the workpiece, followed by a coarse feed initially, a fine feed as the final dimension is approached, and finally a dwell period during which the cutting tools remain stationary to carry out the final sizing or finishing operation to bring the work to its final dimension.

A further objective has been to provide a tracer controlled feed apparatus by means of which the surface speed of the workpiece and feed rate of the cutting tools are related in such a way that a constant cutting speed is approached as the diameter of the workpiece diminishes during the cutting cycle, utilizing a speed change transmission unit which changes the speed of rotation of the workpiece as dictated by the template.

According to this aspect of the invention, the speed change transmission is controlled electrically by a series of speed change switches which are tripped in sequence by the advancing template to increase the speed of rotation during the cutting cycle. The switches are related to the changing slopes of the template, such that the increasing speeds are applied as the rate of tool feed is reduced with the decreasing diameter of the workpiece, thereby to improve the quality of the finished workpiece.

In order to balance the cutting forces and to eliminate the need for feeding the tools longitudinally, the present apparatus utilizes opposed tool slides which are presented to the rotating workpiece from diametrically opposite sides, the tools being located in overlapping relationship along the work axis, such that the opposed cuts overlap one another to produce a finished, accurately dimensioned diameter without requiring any longitudinal tool feed relative to the workpiece.

With reference to this aspect, an objective has been to provide a rack and pinion mechanism which precisely correlates the movement of the opposed tool slides and offset tools toward one another relative to the work axis in response to the operation of a hydraulic cylinder which is connected to the opposed tool slides.

A still further objective has been to provide a simple arrangement whereby the rate of template advancement relative to the rate of work rotation may be varied in order to obtain the most efficient cutting speed, as dictated by the diameter of the workpiece, the material being finished and other variable factors.

For this purpose, there is provided a variable pulley driving connection between the variable speed transmission unit and the screw shaft which advances the template. The variable speed pulley system may be regulated manually in a simple manner by the operator in response to the requirements of the particular run of workpieces being machined.

In order to speed up the cutting cycles and production rate, particularly under automatic operation, a further objective of the invention has been to provide a hydraulically operated rapid traverse apparatus which retracts the cutting tools at the end of the dwell or final sizing period back to the starting position, for removal of the workpiece from the lathe.

In general, the rapid traverse template retracting apparatus comprises an independent hydraulic motor in driving connection with the screw shaft for retracting the template hydraulically and independently of the speed change transmission. The rapid traverse retracting motor is energized in response to an electrical signal which is transmitted by the control system at the end of the dwell period.

SUMMARY

The crankshaft lathe, which has been selected to illustrate the principles of the invention, comprises, in general, a pair of tailstocks which engage the opposite ends of a crankshaft to center it at its axis of rotation, a driving chuck engageable with the crankshaft at a mid-point along its length between the tailstocks together with a speed change transmission unit connected to the chuck for rotating the chuck and workpiece. The speed change transmission unit is also in driving connection with the screw shaft for advancing the template, as explained above. The main or line bearings of the workpiece are machined by the opposed cutting tools which are carried by the tool slides and which, as noted, are interconnected by the rack and pinion drive for unitary motion in opposite directions through operation of the power cylinder under tracer control.

The rate of tool feed is generated by the tracer valve which follows the changing slope of the template as it is shifted longitudinally with respect to the stylus of the tracer valve. The tracer valve, in turn, is hydraulically connected to the feed cylinder which is mechanically connected to one tool slide of an opposed pair or pairs of slides, the piston rod of the cylinder being anchored to the machine, such that the cylinder moves with the tool slide during the tool feeding and retracting movements. The tracer valve is also mechanically connected to the tool slide, such that the valve, cylinder and slide shift in unison in response to minute deflections of the stylus as it traces the template profile (servo action). The template is shifted by its screw shaft at a rate correlated to the rate of work rotation, the template being driven by the variable speed transmission system which drives the chuck and workpiece.

As noted above, the control apparatus is interconnected with the template to decrease the rate of tool feed as the opposed tools approach center and also to increase the speed of work rotation so as to approach a constant cutting speed. At the end of the cutting cycle, and after a dwell period for final sizing, the template is retracted back to its starting position by the hydraulic rapid traverse motor, causing the tracer valve, cylinder and tool slides to be retracted at a rapid rate from the axis of rotation for removal of the finished workpiece from the machine.

The operations of the tracer valve, hydraulic cylinder and tool slides are regulated by an electrical control circuit coacting with a hydraulic system, the electrical circuit including solenoids which actuate the control valves of the hydraulic system. These valves, in turn, apply fluid pressure to the several components of the lathe, such as the clutches of the speed change transmission unit and the rapid traverse, template retracting hydraulic motor. The hydraulic system also powers the tool feed cylinder in response to the template profile through the tracer valve.

DRAWINGS

FIG. 3 is a front elevation diagrammatically illustrating the driving system of the lathe.

FIG. 4 is a right-hand side elevation of the lathe as viewed along the line 4—4 of FIG. 3.

FIG. 5 is a left-hand side elevation of the lathe as viewed along line 5—5 of FIG. 3.

FIG. 6 is an enlarged fragmentary sectional view illustrating the drive chuck taken along line 6—6 of FIG. 3.

FIG. 7 is a sectional view taken along line 7—7 of FIG. 6, further illustrating the chuck.

FIG. 8 is an enlarged fragmentary sectional view taken along line 8—8 of FIG. 3, illustrating the upper and lower tool slides and the rack and pinion drive unit which interconnects the slides.

FIG. 10 is an enlarged fragmentary top plan, as viewed along line 10—10 of FIG. 2, illustrating the template, tracer valve and associated mechanism.

FIG. 14 is a diagrammatic view illustrating the template, tracer valve, tool feed cylinder and opposed tool slides during the initial traverse motion of the tools from the retracted, non-cutting position toward the work axis.

FIG. 15 is a diagrammatic view similar to FIG. 14 showing the components in the position assumed during the initial cutting cycle, with the opposed tools presented to the rotating workpiece.

FIG. 16 is a diagrammatic view of the tracer valve and feed cylinder showing the valve spool position during the tool retracting stroke.

FIG. 17 is a schematic diagram illustrating the electrical and hydraulic circuits which control the operation of the apparatus and which regulate the speed change transmission during the tool feed cycle.

PREFERRED EMBODIMENT

Figure 1:
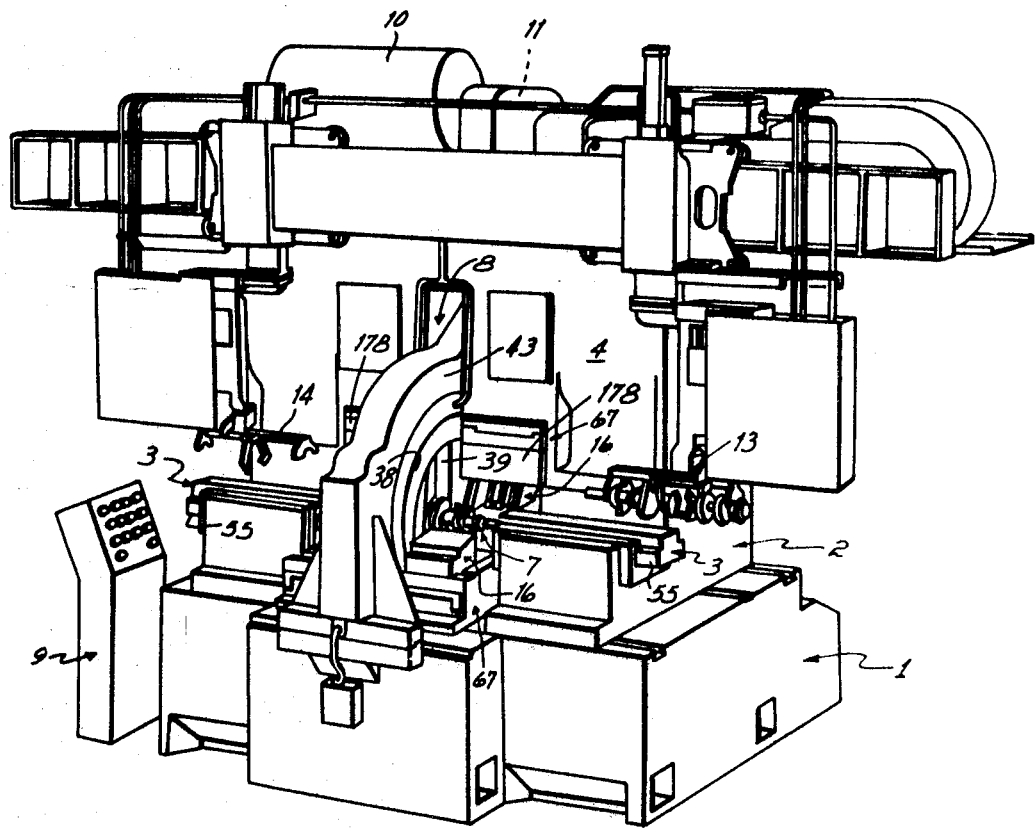
FIG. 1 is a front perspective view of a crankshaft lathe which has been selected to illustrate the principles of the invention.
Figure 2:
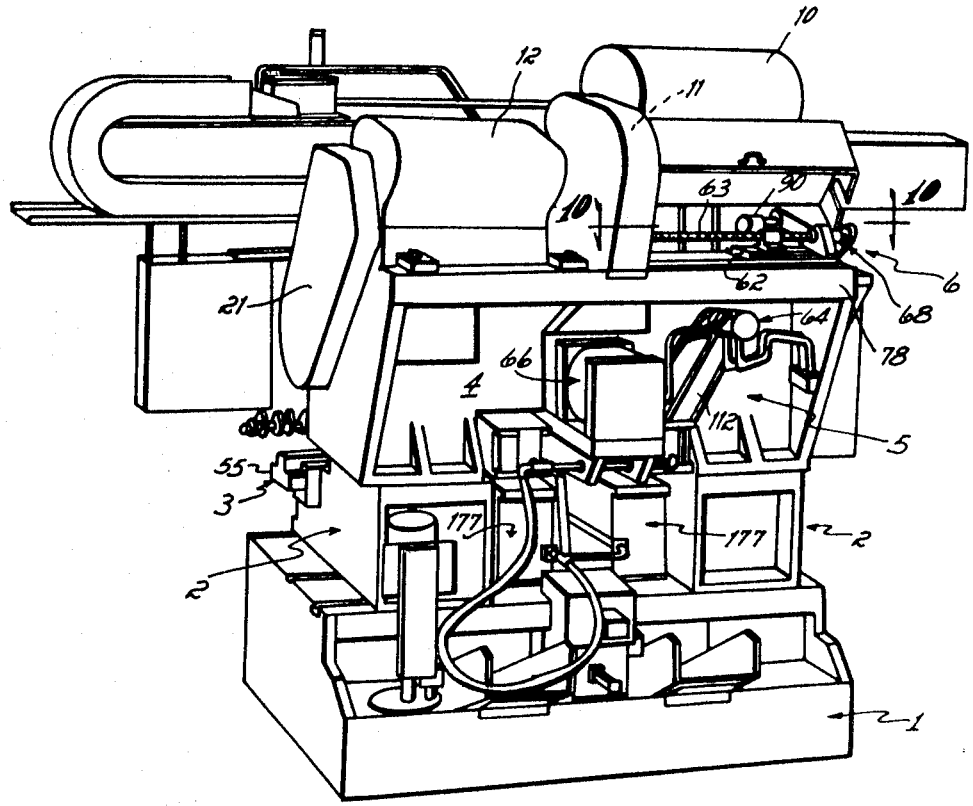
FIG. 2 is a rear perspective view further illustrating the crankshaft lathe.

As best shown in FIGS. 1–3, a crankshaft lathe, which has been selected to illustrate the principles of the invention, comprises, in general, a base 1 in the form of a casting which may include a coolant reservoir, a coolant pump and other components (not shown) which do not form a part of the invention. The upper surface of the base is provided with conventional T-slots with a bed consisting of sections 2—2 mounted upon the upper surface of the base. The bed is clamped in position with respect to the base by means of T-nuts in the usual way. The bed 2 includes channel ways in its forward portion for adjustably mounting the tailstocks 3, which include centering spindles for engaging opposite ends of the workpiece, as explained later.

Bed 2 includes a housing or upper base 4, also in the form of a casting, which rests upon the bed 2 and which is secured thereto by T-nuts engaged in T-shaped slots formed in the upper surface of the bed 2.

Figure 11:
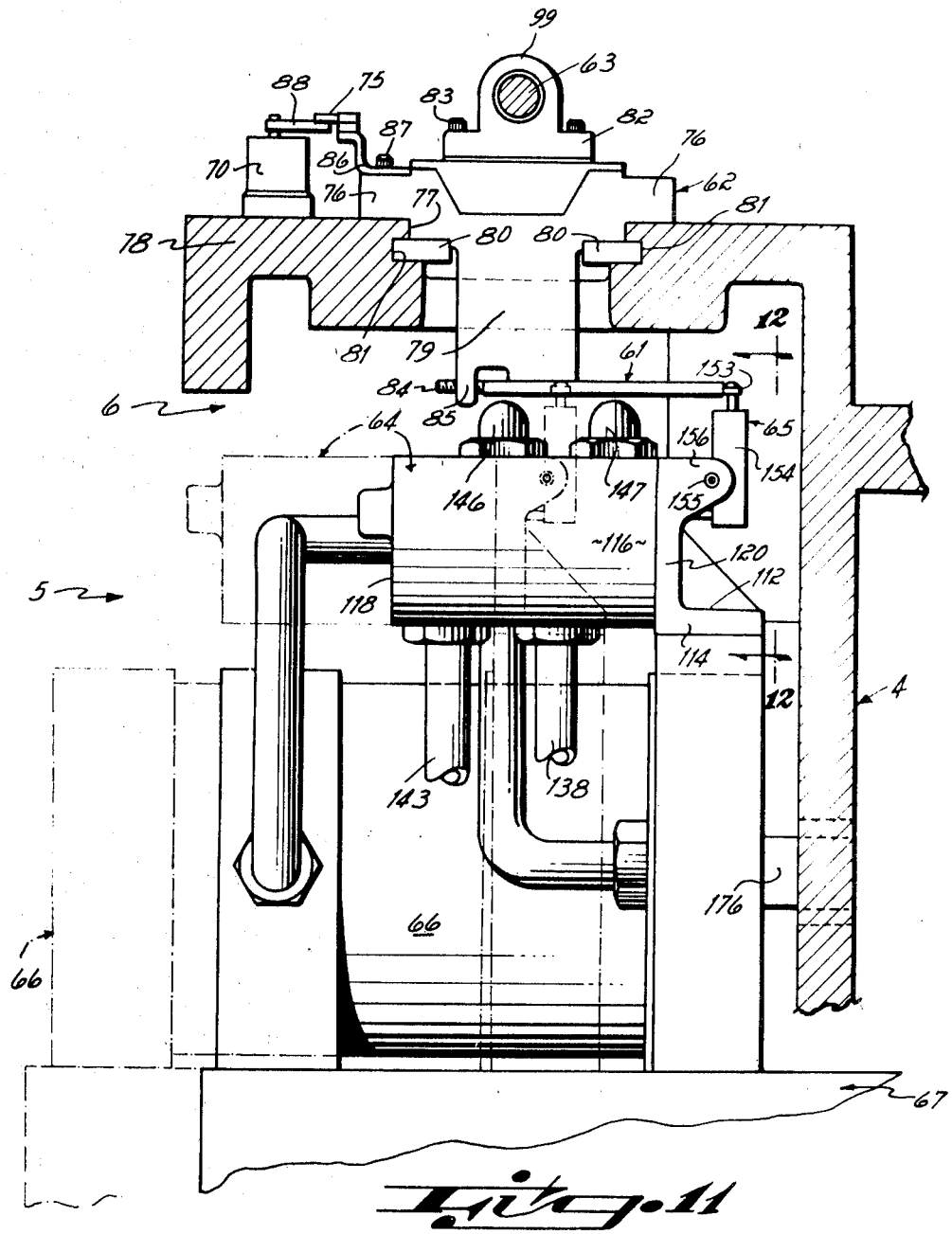
FIG. 11 is a fragmentary sectional view taken along the line 11—11 of FIG. 10 further illustrating the tracer mechanism.

A hydraulic tool feed cylinder assembly 5, which actuates opposed tool slides in response to the hydraulic tracer apparatus, is mounted at the rear of the housing 4 (FIG. 2). The tracer apparatus, which is indicated generally at 6 in FIGS. 2, 10 and 11, is mounted upon the top surface of the housing 4.

The workpiece, in the present example, comprises the crankshaft, indicated generally at 7 (FIGS. 6 and 7), centered between the shiftable tailstocks 3—3 during the operating cycle. The crankshaft is driven by a chuck, indicated generally at 8, FIGS. 3, 6 and 7, which engages the crankshaft at a mid-point along its length, while the opposed cutting tools, under control of the tracer apparatus 6, are fed by the hydraulic tool feed mechanism 5 toward the diametrically opposite sides of the main or line bearings of the crankshaft.

As viewed in FIGS. 3, 4 and 5, the crankshaft lathe is powered by a main motor 10 which is mounted upon the top surface of the housing 4. The motor 10 is in driving connection through a belt and pulley system 11 with a speed change transmission unit 12, also mounted upon the top surface of housing 4.

It will be understood that before delivery to the crankshaft lathe, the opposite ends of the rough crankshaft will have been drilled to a predetermined depth to provide tapered centering bores for the reception of the tapered ends of the spindles of the tailstocks 3—3, the spindles being rotatably mounted within the tailstocks. In addition prior to reaching the lathe, locating and driving flats will have been milled on one of the intermediate lobes of the crankshaft for engagement by the crankshaft grippers of the chuck 8. The grippers are shifted from an unclamping or open position into engagement with the flats of the crankshaft by power, as indicated in FIGS. 6 and 7.

In the present example, the crankshaft 7 is handled mechanically for which purpose there is provided a loading arm 13 (FIG. 1) on the right-hand side of the machine, and an unloading arm 14 on the left-hand side of the machine. The arrangement is such that under production conditions a loading conveyor (not shown) delivers the rough crankshafts to the right-hand side of the machine and the loading arm 13 engages the rough crankshaft and places it in the chuck 8 for the finishing operation.

At completion of the machining operation, the crankshaft, with its main bearings finished, is removed from the chuck by the unloading arm 14 and placed on an unloading conveyor (not shown). The chuck 8 operates by power to engage the rough crankshaft as it is placed in position by the loading arm and unchucks or releases the finished crankshaft after the machining operation to be engaged by the unloading arm 14 for delivery from the machine.

It will be understood that the machine may be operated manually or automatically. Under automatic operation, the conveyors deliver the rough crankshafts continously to be engaged by the loading arm 13, placed in the chuck 8, finished, then delivered from the machine to the unloading conveyor by the unloading arm 14.

Under manual operation, the operator retracts the tailstock centers, opens the chuck, and initiates the loading and unloading operations by depressing appropriate push buttons carried by a console, indicated at 9 in FIGS. 1 and 17. Other appropriate push buttons are then depressed to close the chuck, advance the tailstock centers and start the machining cycle.

As noted above, the tailstocks 3—3 are mounted in slideways formed in the bed 2 and are shifted hydraulically relative to one another along the axis of work rotation. At the start of a cycle, a finished crankshaft is released from the chuck 8 by actuation of a suitable switch which energizes the clamping mechanism of the chuck. It will be understood at this point that the opposed cutting tools will have been withdrawn from the main bearings of the crankshaft at completion of the previous machining cycle.

As the crankshaft is unchucked, the tailstocks 3—3 are withdrawn from the ends of the finished crankshaft by hydraulic pressure. At the same time, the unloading arm 14 picks up the finished crankshaft from the chuck 8 while the loading arm 13 picks up a rough crankshaft from the conveyor. With the finished and rough crankshafts thus engaged, the arms 13 and 14, with the crankshafts, are elevated to raise the crankshafts above the work axis 15; thereafter, both arms 13 and 14 move together along an axis parallel to but spaced above the axis 15 so as to remove the finished crankshaft from the chuck while locating the rough crankshaft in position for chucking. Both arms are then lowered to align the rough crankshaft with the chuck and to deliver the finished crankshaft to the unloading conveyor. The tailstocks 3 now move toward one another along axis 15 to engage the drilled centers at opposite ends of the crankshaft.

With the crankshaft engaged between the centering spindles of the tailstocks 3—3, the opposed cutting tools, by operation of the tool feed tracer apparatus 6 of the invention, move inwardly toward one another at a traverse rate, then at the changing feed rates, and finally to a dwell position for the final finish or sizing operation. Thereafter, the tools are retracted away from the finished crankshaft. The machine slows and is stopped with the chuck in proper radial position for unloading. At this point, the chuck releases the crankshaft and the concurrent loading and unloading cycle, above described, is repeated.

In order to improve the cutting action, a constant cutting speed is approached during the machining operation. For this purpose, the speed change transmission unit 12 is arranged to drive the chuck 8 at changing speeds during the cycle. The speeds are regulated by clutches within the transmission unit which are controlled by the electrical-hydraulic circuit, as described later.

The apparatus of the invention, in the present example, is arranged to machine the main bearings or concentric portions (axis 15) concurrently during the cutting cycle. The opposed cutting tools, indicated generally at 16 (FIGS. 7 and 8) have cutting edges presented to the workpiece at diametrically opposed sides to provide overlapping cuts; therefore, no longitudinal tool feed is required. One of the overlapped bearing areas is shown at 19 in FIG. 7.

DRIVING SYSTEM

As noted earlier, the chuck 8 is driven by the main motor 10 through the speed change transmission 12 during the machining cycle. As best shown in FIGS. 3, 4 and 5 the motor 10 is in driving connection with the speed change transmission unit 12 by way of the belt and pulley system 11 located between the motor 10 and the transmission unit 12. As described later with reference to FIG. 17, the speed change transmission unit 12 includes a constant mesh gear train arranged, in the present example, to drive chuck 8 at three different speeds in order to approach a constant cutting speed as the crankshaft bearings are machined. The clutches are operated hydraulically under control of the electrical circuit.

As best shown in FIGS. 3 and 4, the output shaft 18 of the transmission unit 12 includes an external pinion 20 which drives a gear train carried on the right-hand side of the housing 4 leading to the chuck 8. The gear train is enclosed in a cover 21 (FIG. 2) attached to the housing 4.

It is to be noted at this point that the gear train also drives a spindle timing and positioning device located on the opposite or left-hand side of housing 4. This device, indicated generally at 22, includes a disk having a set of adjustable dogs (not shown) which are arranged to trip a series of limit switches mounted in a stationary position on the left-hand side of housing 4. The positioning device 22 locates the rotary element of the chuck 8 in its loading and unloading positions at the start of the cycle and also regulates the movement of the crankshaft gripper element during the loading and unloading operations. This portion of the machine does not form a part of the invention and is not disclosed in detail.

The gear train to the chuck 8 (FIGS. 3 and 4) includes an idler gear 23 journalled on idler shaft 24 and in mesh with the drive pinion 18 of transmission unit 12. Idler gear 23 meshes with a gear 25 which is keyed to a drive shaft 26. Shaft 26 extends through housing 4 from the right-hand to the left-hand side and is journalled upon suitable bearings within housing 4. Upon the opposite or left-hand end of shaft 26 (FIGS. 3 and 5) there is keyed a pinion 27 meshing with the gear 28 journalled on a stub shaft 29.

The disk of the timing device 22 is attached to the gear 28, the ratio being such that the gear 28 and disk of the timing device 22 are rotated at a one-to-one ratio with the driving head of chuck 8. The gear 28 (FIGS. 3 and 5) in the present example, establishes a driving connection with the tool feed tracer apparatus 6 so as to feed the cutting tools at a rate related to the rate of rotation of the crankshaft during the machining cycle. The driving connection to the tracer apparatus is described in greater detail in the section of this specification in which the tracer apparatus is described.

The drive to chuck 8 (FIGS. 3, 4 and 6) is completed from drive shaft 26 by a pinion 30, also keyed to shaft 26 along with gear 25, and in mesh with an idler gear 31 journalled on a stub shaft 32. The idler pinion 31 meshes with a ring gear 34 which forms a part of chuck 8. As described later, the chuck 8 includes a drive head which is mounted for rotation about the work axis 15 in alignment with the centering spindles of the tailstocks 3—3, between which the opposite ends of the crankshaft 7 are rotatably confined.

CHUCK

As noted earlier, the crankshaft 7 is rotated during the machining cycle by the drive head of the chuck 8 which establishes a driving engagement with one of the webs or lobes of the crankshaft at a point intermediate its length. It will be noted in FIGS. 6 and 7 that the crankshaft comprises the main or line bearings 35 (which are machined, in the present example) with webs or lobes 36, and with crank pins 37 extending between the lobes 36.

The chuck is not disclosed in detail since it does not form a part of the invention. As shown generally in FIGS. 6 and 7, the chuck comprises a circular drive head 38 mounted for rotation about the work axis 15 which coincides with the centers of the tailstocks 3. The chuck drive head 38 is of restricted width (FIG. 7) permitting turning of all the main bearings of the crankshaft without interference.

The drive head 38 includes a radial opening 39 extending from its central portion to its periphery to permit conventional loading and unloading of the crankshafts 7 (arms 13 and 14). It will be noted in FIG. 6 that the radial opening 39 of the drive head resides in a vertical position when the head is in its stationary loading and unloading position at the end of the cycle. It is held in this position by the pinion 31 meshing with ring gear 34 and by operation of the transmission unit 12 which is braked in stationary position by the spindle timing and positioning device 22 through operation of the control system.

During the loading operation, the rough crankshaft is lifted from the loading conveyor by arm 13 and the finished crankshaft is engaged by the unloading arm 14. The arms are then elevated (with the crankshafts engaged therein) to a position above axis 15. The arms 13 and 14 then move toward the left so as to shift the finished crankshaft endwisely and outwardly through the radial opening 39 and to pass the rough crankshaft endwisely into the opening 39. The rough crankshaft is then lowered by the arms to the work axis 15 for endwise engagement by the tailstocks 3—3.

After having been centered by the tailstocks, the chuck is energized to cause engagement of the crankshaft by the drive head 38. One of the intermediate webs or lobes 36, previously noted, previously has been milled to provide flats for engagement by the gripper elements of the drive head 38. Thus, as shown in FIGS. 6 and 7, the lobe 36 is provided with several flats 40, suitably spaced about the lobe and precision machined to provide engagement areas for the gripper elements without imposing radial stresses which would tend to misalign the crankshaft with reference to the tailstocks.

The drive head 38 of the chuck is journalled for rotation within a stationary casing 43 (FIGS. 1, 3 and 4) which is bolted to the base 1. For this purpose, respective shoulders (not shown) are machined about the periphery of the drive head at opposite sides. The shoulders provide journals about the outer periphery of the drive head leaving the center portion open for reception of the crankshafts.

The stationary casing 43 includes peripheral bearing surfaces in bearing engagement with the journals at opposite sides of the drive head (not shown). The casing may also include suitable seals which protect the bearing surfaces from dust and dirt. The external ring gear 34, previously noted, is mounted upon the periphery of the drive head between the journals and is suitably keyed thereon, the idler pinion 31 of shaft 32 being in mesh with ring gear 34 for rotating the drive head.

The drive head 37 includes a clamping jaw 44 (FIG. 7) which is mounted for swinging motion about a pivot shaft 45 carried by the drive head. The drive head includes a recess 46 which provides clearance for the clamping jaw 44.

During the loading and unloading operations, with the radial opening 39 in its upright position, the clamping jaw 44 is pivoted to its open position. In clamping the crankshaft, the jaw is pivoted about its stub shaft 45 by self-locking power means, for example, a worm and wheel drive (not shown). In order to clamp the crankshaft rigidly without imposing radial stress, the drive head 38 is provided with a stationary anvil 51 having abutments which are precisely located in positions to engage the flats 40 of the lobe 36. A second stationary anvil (not shown) engages other flats of the lobe such that the crankshaft is engaged at three points for locating purposes.

The forward face of the clamping jaw 44 includes a clearance recess 53 which includes a clamping block 54 located to engage the crank pin 37 adjacent the lobe 36 at a point approximately opposite the anvil 51 to provide the clamping pressure. When the clamping jaw 44 swings to its clamping position, the clamping block 54 establishes a wedging engagement with the surface of the crank pin 37 in a slightly off-center position so as to force the crankshaft into bearing engagement with the locating surfaces of the anvil 51, thereby to establish the clamping and driving engagement with the crank pin and lobe. After the clamping engagement is established, the drive head 38 is driven at the proper rotary speed to carry out the machining operation.

TAILSTOCKS

The tailstocks 3—3 may be of any suitable design and have not been disclosed in detail. In the present example, they are retracted and advanced by hydraulic power as part of the automatic sequence or under manual push button control. As best shown in FIGS. 1, 3 and 4, each tailstock 3 comprises a mounting head 55 having a base portion 56 which is seated in a channel 57 machined into the forward portion of the bed section 2. In the form illustrated, the mounting heads 55 at opposite sides of the chuck 8 are clamped rigidly in position within the channels 57 by means of clamping gibs 58—58 which are fitted between the mounting heads 55 and surfaces of channel 57.

Each mounting head 55 includes a tapered centering spindle 60, the ends of which engage the tapered centering holes at opposite ends of the crankshaft in the usual way. In the present example, the spindles 60 are mounted for rotation with the crankshaft relative to the mounting heads 55.

In the preferred form, the mounting heads 55, which are clamped in fixed position relative to bed 2, each include hydraulic piston means connected to the centering spindles 60 for shifting the spindles to an advanced or retracted position. Each mounting head is hydraulically interconnected with a suitable reversing valve (not shown) which may be electrically controlled for supplying and exhausting hydraulic pressure with reference to the mounting heads 55 for advancing or retracting the centering spindles 60 during the unloading and loading operations. The mounting heads are provided with suitable limit switches arranged to regulate the travel of the centering spindles to their retracted and advanced positions.

TRACER APPARATUS GENERALLY

The tracer controlled hydraulic feed apparatus 6 of the invention correlates the cutting tool feed rate to the rate of rotation of the crankshaft in order to approach a constant cutting speed during the machine cycle, as noted earlier. It will be understood at this point that the feeding mechanism, by virtue of the overlapping relationship 19 of the opposed cutting tools (FIG. 7), shifts the tool slides and tools along a line at right angles to the axis of rotation of the crankshaft or other workpiece, no component of longitudinal feed being necessary Generally speaking, (FIGS. 10–15) the apparatus comprises a shiftable template 61 mounted upon the slide 62 for longitudinal sliding motion relative to the upper surface of housing 4, the template having a working profile which generates different rates of tool feed. As the template is moved longitudinally at a given rate (which may be selected by the operator, as explained later) then the opposed tool slides and tools follow the template profile at a rate equal to the tangent of the template profile at a rate equal to the tangent of the template slope times the rate of longitudinal motion which is imparted to the template.

In the present example, the template profile generates a rapid traverse rate which brings the cutting tools at a rapid rate (to save time) from a retracted non-cutting position to a cutting position followed by a slower coarse feed rate, during which the tools are presented in cutting engagement to the work surface The cutting cycle continues with a fine feed rate, then terminates with a dwell period during which the tools are held in their final position against a fixed stop to carry out the finishing or sizing operation. These rates are related to the three speeds which are provided by the transmission unit 12, such that the rate of rotation of the crankshaft is increased in stepwise fashion at the cutting tools move toward the center of rotation, thus approaching a constant surface speed during the cutting cycle.

At completion of the cutting cycle and after the predetermined dwell period, the template is shifted back or retracted to its starting position at a rapid traverse retracting rate, the cutting tools being retracted at a corresponding rate to a position clear of the workpiece for unloading the finished workpiece and loading the subsequent rough workpiece In general, the template 61 (FIGS. 10 and 11) is moved during the machining cycle by a lead screw shaft 63 which, as explained in detail later, is in driving connection with the transmission system of the chuck. The feed rate is controlled by the hydraulic tracer valve, indicated generally at 64, having a stylus 65 which follows the profile of template 61 during the cycle. The tracer valve 64, coacting with its tool feed cylinder, provides a servo action which responds to the profile of the template as the template is shifted longitudinally relative to the stylus 65 of the tracer valve.

In order to provide the servo action, the tracer valve 64 is mounted in direct mechanical connection with the hydraulic actuating cylinder, indicated generally at 66 (FIG. 11 and diagrammatically in FIGS. 14 and 15). The cylinder 66, in turn, is mounted upon a tool slide assembly, indicated generally at 67, consisting of upper and lower tool slides, interconnected with one another for opposed motion and arranged to present the opposed cutting tools 16 to the diametrically opposite sides of the line bearings 35 of the crankshaft 7 (FIGS. 8, 14 and 15).

As noted earlier, the rate of rotation of the template lead screw shaft 63 is related to the rate of rotation of the crankshaft by virtue of the driving connection provided by the cross shaft 26, pinion 27 and gear 28 (FIG. 5). The drive to the lead screw shaft 63 is completed from gear 28 of timer 22 by way of the variable speed pulley system, indicated generally at 68 (FIGS. 5 and 10) and described later. It will be understood at this point that the relationship of the feed rate to the rate of rotation of the crankshaft may be varied by manual adjustment of the variable speed pulley system 68.

In order to correlate the speed of work rotation and the feed rate of the tools, the tracer apparatus 62 includes three limit switches 70, 71 and 72 attached to the upper surface of housing 4. The template slide 62 includes a set of trip dogs 73, 74 and 75 which trip the three limit switches successively during the tool feed movement of the template and its slide. The limit switches are in electrical connection with the control system and regulate the operation of the speed control clutches of the main transmission unit 12.

TEMPLATE ACTUATING MECHANISM

As best shown in FIGS. 10 and 11, the template slide 62 is in the form of a block having flange portions 76—76 overlying the opposite sides of a longitudinal slot 77 formed in the rearward overhang 78 of the housing 4. The slide 62 is provided with slide rails 80—80 on opposite sides which are slidably engaged in ways 81—81 of the overhang 78 at opposite sides of slot 77. The slide includes a portion 79 depending downwardly from the flanges 76 and having its lower end disposed below the surface of the overhang 78.

The template 61 is secured to the bottom surface of the depending portion 79 by screws (not shown) passing through slots formed in the template to permit adjustment of the template position. The template is adjusted with reference to the tracer valve 64 by means of one or more set screws 84 passing through a lug 85 projecting downwardly from the depending portion 79 of the slide.

As viewed in FIG. 10, the dogs 73, 74 and 75 which trip the limit switches 70, 71 and 72 are mounted upon individual brackets 86 secured by screws 87 along the rearward edge of the slide 62. Each limit switch includes a switch arm 88 including a roller which is engaged by the respective dogs.

As explained later, the template slide and template are retracted at a rapid traverse rate at the limit of its feed stroke by a hydraulic template retracting motor, indicated generally at 90 (FIG. 10), which is mounted upon the housing 4 adjacent the lead screw shaft 63. The operation of the template retracting motor 90, referred to as a "hydraulic traverse motor," is regulated by a traverse switch 91 having a plunger 92. The plunger 92 follows the edge of a cam bar 93 clamped to the forward edge of the slide 62 by screws 94. The cam bar 93 actuates switch 91 and, through operation of the control system, energizes the hydraulic traverse motor 90, causing the lead screw to shift slide 62 and template 61 back to its starting position at the limit of its tool feed motion.

The template is shown at the feed limit in FIG. 10 and is retracted from that position by hydraulic motor 90 at the rapid traverse rate back to the starting position. The variable speed pulley system 68 includes a slip clutch which permits rotation of the lead screw 63 during operation of traverse motor 90.

The lead screw shaft 62 is journalled at opposite ends in the pillow blocks 95—95 (FIG. 10) which are secured by screws 89 to the top surface of housing 4 adjacent the opposite ends of the slot 77. The pillow blocks include suitable bearings (not shown) which rotatably support the screw shaft 63; the end portions of shaft 63 include collars 96—96 bearing against the pillow blocks 95 to hold the shaft 63 against endwise motion. The template slide 62 is connected to the screw shaft 63 by a nut 99 (FIGS. 10 and 11) in threaded engagement with the screw shaft. The nut includes flanges 82 at opposite sides which are attached to the top of slide 62 by screws 83.

The variable speed pulley drive 68 is of commercial design and has not been illustrated in detail. In general, the pulley drive includes a variable pitch pulley 97 mounted on an end portion 98 of the lead screw shaft 63, the pulley being of split construction adapting the two sections of the pulley 97 to be shifted relative to one another in response to belt pressure, thereby to vary the pitch diameter of the pulley. A compression spring 100, confined between a collar 97A and one section of pulley 97, permits spreading of the pulley sections. In order to provide slippage for operation of the hydraulic rapid traverse motor 90, the variable pulley 97 includes a friction clutch (not shown) which permits the screw shaft 63 to be rotated relative to the pulley variable pitch drive 68 during rapid traverse retracting movement of the template.

Pulley 97 is driven by a V-belt 101 which passes about an adjustable variable speed pulley 102 carried upon a shaft 103 (FIG. 5) projecting from housing 4. In the present example, pulley 102 is driven by a pinion 104 meshing with the gear 28, which, as previously described, rotates the timing and positioning device 22. The variable speed pulley 102 is thus driven from the chuck gear train at a speed related to the speed of rotation of the chuck drive head 38.

The pitch diameter of the variable speed pulley 102 is regulated manually by an external knob 105 through a suitable adjustment element, such as a threaded shaft (not shown) whereby the spacing of the sections of pulley 102 may be varied. This adjustment, in turn, changes the rate of rotation of the screw shaft 63 in relation to work speed. The adjustment may be made to compensate for the diameter of various crankshafts or workpieces for which the machine may be set up and also to compensate for the material being turned and other variable factors.

As shown in FIG. 10, the hydraulic traverse template retracting motor 90 includes a base 106 secured by screws 107 to the top surface of housing 4 adjacent the screw shaft 63. The motor includes a drive sprocket 108 and the screw shaft 63 includes a driven sprocket 110 keyed or otherwise secured to shaft 63. A sprocket chain 111 establishes a driving connection between sprockets 108 and 110.

TRACER VALVE AND OPERATION

The tracer valve 64 (FIGS. 11, 12 and 13) is mounted below the overhang 8 of housing 4 and immediately below the template 61. The tracer valve 64 is connected to the upper slide of tool slide assembly 67 for movement in unison with the tool slide and hydraulic cylinder 66, the hydraulic connections extending directly from the tracer valve 64 to the cylinder 66 of cylinder assembly 5. In order to mount the tracer valve in its proper position above cylinder 66 and adjacent the template 61, there is provided a bracket 112 having a flange bolted to a portion of the upper tool slide of assembly 67. The bracket projects at an angle upwardly and outwardly and includes a flange 114 at its upper end upon which is mounted the tracer valve 64. The tracer valve includes a mounting flange 115 seated upon the flange 114 of bracket 112 and is secured in place by the screws 113.

The tracer valve 64 essentially comprises a reversing valve interconnected with opposite ends of hydraulic cylinder 66 so as to supply and exhaust hydraulic pressure relative to the opposite ends of the cylinder, thereby to shift cylinder 66 and tool slide assembly 67 in forward and reverse directions. This action takes place during the forward or feed motion of the template 61 and also during the rapid traverse return motion of the template (motor 90).

During the feed stroke, deflection of the stylus 65 by the moving template profile imparts a follow-up motion by operation of the valve so as to move the cylinder, tool slide assembly and valve, as an integral unit, a distance corresponding to the degree of deflection of the stylus and in the same direction. The response of the valve, cylinder and tool slide assembly is immediate, that is, the lag between stylus movement and movement of the valve, cylinder and tool slide as a unit takes place concurrently with the stylus deflection by reason of the relatively large volumetric flow rate which is provided by the valve.

As described below, the valve includes a pressure passageway communicating with a source of hydraulic pressure and further includes two passageways communicating with the opposite ends of the tool feed cylinder 66. In addition, there is provided an exhaust passageway leading back to the sump of the hydraulic system, the arrangement being such that upon shifting of the valve, fluid pressure is supplied by way of the pressure passageway through the valve to one end of the tool feed cylinder 66 of assembly 5, while fluid pressure is exhausted from the opposite end of the cylinder 66 and through the valve by way of the exhaust passageway back to the sump of the hydraulic supply unit, which includes a pump.

Figure 13:
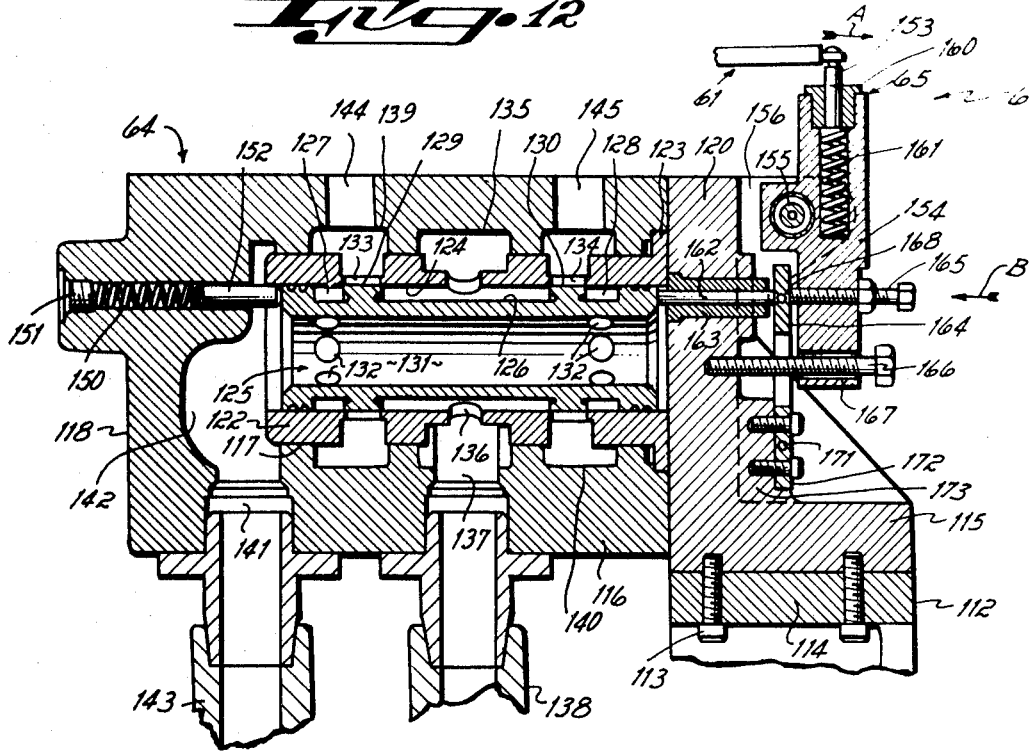
FIG. 13 is a sectional view taken along line 13—13 of FIG. 12 detailing the internal construction of the tracer valve.

With reference to FIG. 13, the tracer valve 64 comprises a cylindrical valve casing 116 having an internal bore 117. One end of casing 116 includes an integral end wall 118. The opposite end of casing 116 is provided with a cylinder head 120 which also forms a mounting bracket for the tracer valve assembly. The casing 116 is secured to cylinder head 120 by screws (not shown). The cylinder head 120 includes the mounting flange 115 which is secured to the upper flange 114 of bracket 112, previously described.

Valve casing 116 includes an internal flow control sleeve 122 fixed in a stationary position within the casing. The control sleeve 122 includes a flange 123 seated in a recess formed in the open end of casing 116 and clamped in place by the cylinder head 120.

The flow control sleeve 122 includes an internal bore 124 in which is slideably confined a shiftable valve spool 125. The valve spool 125 has a central necked portion 126, a left necked portion 127 and a right necked portion 128. The necked portions 126, 127 and 128 delineates a pair of lands 129 and 130 which control the flow of hydraulic fluid in forward and reverse directions with respect to cylinder 66 in response to movements of the valve spool 125. The internal bore 131 of valve spool 125 includes open ports 132 communicating with the right and left necked portions 127 and 128.

The land 129 at the left-hand end of valve spool 125 normally covers the ports 133 of flow control sleeve 122 and the lands 130 at the right-hand end of spool 125 normally cover the ports 134 of the sleeve 122. It is to be noted that the width of the lands 129 and 130 are substantially equal to the width of the ports 133 and 134 against which they seat, the lands being just sufficiently wider than the ports to block the flow of fluid when the valve spool 125 is in the neutral position shown in FIG. 13.

The valve casing includes an internal annular groove 135 at its center communicating with central necked portion 126 of the valve spool 125 by way of the ports 136. A pressure passageway 137 communicates with the annular groove 135 and is connected to a pressure conduit 138 which supplies fluid pressure to the valve. The valve casing 116 further includes a left annular groove 139 and a right annular groove 140 located on opposite sides of the central groove 135. The flow control ports 133 and 134 of the flow control sleeve 122 communicate with the annular grooves 139 and 140.

The valve casing 116 includes an exhaust passageway 141 communicating with a chamber 142 formed in the left-hand end of the valve casing. An exhaust conduit 143, leading to the hydraulic unit (not shown), communicates with the chamber 142, such that exhaust fluid flows through the bore 131 of valve spool 125 when the spool is shifted from its neutral position. In addition, the annular grooves 139 and 140 at opposite end portions of casing 116 each include passageways 144 and 145 communicating with conduits 146 and 147 (FIG. 11). These conduits communicate with the opposite ends of cylinder 66 to supply and exhaust fluid pressure relative to the opposite ends of the cylinder in response to operation of the valve, as described later with reference to FIGS. 14, 15 and 16.

Figure 12:
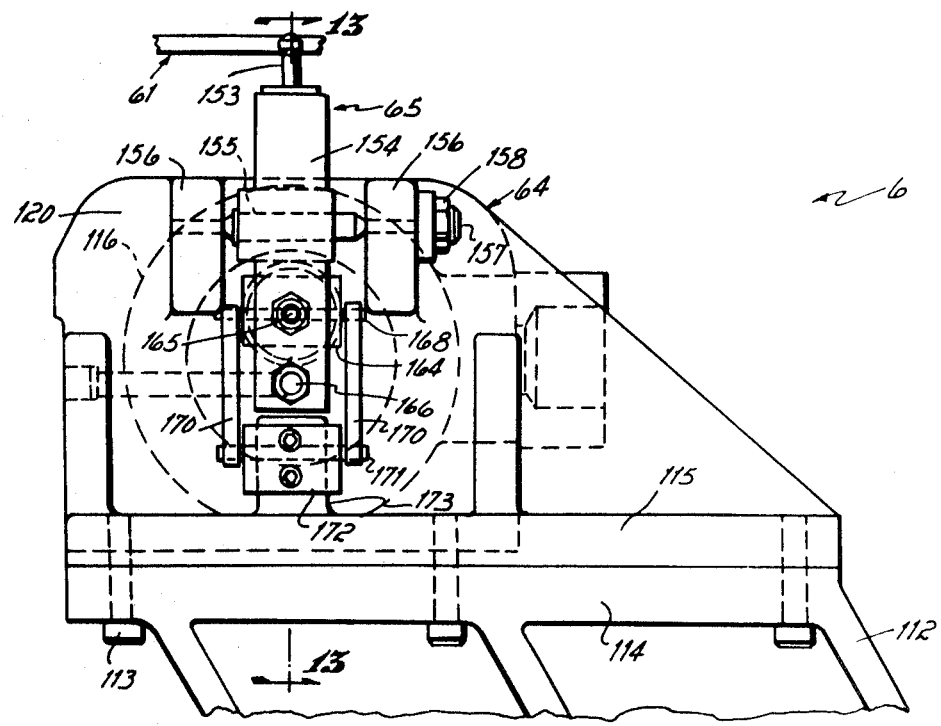
FIG. 12 is a fragmentary end elevation as viewed along the line 12—12 of FIG. 11 further illustrating the tracer apparatus and template arrangement.

The valve spool 125 is actuated by the stylus assembly, indicated generally at 65, which is pivotally connected to the cylinder head 120 (FIGS. 12 and 13). In general, the valve spool 125 is constantly biased toward the right by a compression spring 150 seated against a plug 151 in a bore formed in the left end of the casing 116. The spring 150 is seated against a pin 152 having an end bearing against the left end of the valve spool 125.

The biasing force of the spool 125 acts against the stylus assembly 65 and is resisted by the profile of the template 61 against which the stylus is engaged. As the template 61 traverses the stylus during the feed stroke, the increasing slope of the template urges the stylus pin 153 toward the right, as indicated by the arrow A (FIG. 3). The stylus assembly 65 is pivotally connected to the cylinder head 120, such that the swinging movement of the stylus assembly tends to shift the valve spool 125 toward the left, counter to the biasing effect of spring 150.

Described in detail (FIGS. 12 and 13) the stylus assembly 65 comprises a lever bar 154 pivotally supported by a pivot pin 155 which projects through it, the pin 155 having opposite ends confined between a pair of lugs 156—156 projecting outwardly from cylinder head 120. The opposite ends of pivot pin 155 are conical and include pivot points seated against hardened bearing elements (not shown) to reduce friction to a minimum. An adjustment screw 157 (FIG. 12) is regulated to take up looseness and is locked in adjusted position by a nut 158.

The stylus pin 153 projects upwardly through a bushing 160 threaded into the upper end of the lever bar 154. A spring 161 is seated in compression in a bore formed in lever bar 154 and has an upper end seated against the headed inner end of stylus pin 153. Adjustment of the threaded bushing 160 permits the stylus pin to be adjusted vertically relative to the horizontal plane of template 61.

As the template 61 advances during the tool feed stroke, the stylus is deflected by the rising slope of the template in the direction indicated by the arrow A in FIG. 13. The lower portion of lever bar 154, which extends below pivot pin 155, thus shifts the valve spool minutely toward the left, as indicated by the arrow B in FIG. 13. For this purpose, a thrust pin 163 (FIG. 13) passes through the cylinder head 120 and includes an inner end engaging the right-hand end of valve spool 125. The thrust pin 162 is slideably confined in a bushing 163 passing through cylinder head 120. The outer end of pin 162 is engaged against a thrust plate 164. The plate 164, in turn, is engaged by the inner end of an adjustment screw 165 threaded through lever bar 154 and locked in adjustment by a nut.

In order to limit the swinging motion of lever bar 154 in the event that stylus pin 153 is free of template 61, there is provided a headed stop screw 166 having an inner end threaded to the cylinder head 120. The lower swinging portion of lever 154 includes a clearance bore 167 through which the shank of the stop screw 166 passes, the arrangement being such that the lever 154 is free to rock within its normal limits without interference.

The thrust plate 164, previously noted, is pivotally supported as at 168 between a pair of arms 170—170 (FIG. 12), the lower ends of which are pivotally supported by a pivot pin 171. The pivot pin 171 passes through a mounting plate 172 secured by screws to a lug 173 projecting from the cylinder head 120.

From the foregoing, it will be noted that the spool 125 of the tracer valve is normally poised in a neutral or balanced position by operation of the compression spring 150 which biases the spool toward the right against the thrust pin 162 of the stylus assembly, such that the stylus pin 153, engaged against the template 61, acts as a stop. As the stylus pin 153 follows the template profile which slopes outwardly, the stylus pin 153 is deflected minutely to the right (arrow A) shifting spool 125 toward the left (arrow B).

This minute motion of spool 125 introduces fluid into the end of cylinder 66 forwardly of its piston 175 (FIG. 14) by way of pressure conduit 138, central annular groove 135, ports 136 of flow control sleeve, central necked portion 126 and through left port 133, which is now uncovered by land 129. From uncovered left port 133 fluid flows by way of left annular groove 139 through port 144 and conduit 146 to the forward end of cylinder 66.

Fluid pressure is exhausted from the opposite side of piston 175 by way of conduit 147, port 145, right annular groove 140, and through right port 134 (uncovered by land 130). From right port 134, the fluid flows through right neck 128, ports 132 of spool 125 to the internal bore 131 of the spool to the chamber 142 and through exhaust conduit 143 back to the sump of the hydraulic pressure supply unit. Piston 175 includes a piston rod 176 which is anchored to the housing 4 such that cylinder 66 shifts relative to the stationary piston. The flow of fluid between the valve and cylinder for rapid traverse in the feed direction is indicated by the arrows in FIG. 14. Thus (FIGS. 14 and 15), the tool slide and tracer valve are shifted in feed direction (arrow C) at the rapid traverse rate, as determined by the rapid traverse slope D of template 61 which is shifting in the direction indicated by the arrow E.

At completion of the rapid traverse feed motion, the opposed cutting tools will have been presented to the surface of the rotating workpiece (FIG. 15), at which time the stylus pin 153 encounters the coarse feed slope F of the template. During the movement through the coarse feed section F of the template relative to the stylus pin, the tracer valve continues to apply fluid pressure to cylinder 66 as described above, in the same direction but at a slower rate because of the decrease in the angle of slope F.

The same conditions prevail as the stylus traces the fine feed profile section G. As the moving template approaches the end of its fine feed travel, with the stylus tracing the fine feed profile G, the tool slide assembly 67 engages a positive stop indicated at 174 in FIGS. 8 and 15, at which stage the opposed cutting tools are held in stationary position for the final finish or sizing operation.

The tools dwell in this position for a predetermined period of time, then the template retracting traverse control switch 91 (FIG. 10), by operation of cam bar 93, energizes the hydraulic traverse motor 90, causing the screw shaft 63 to be rotated in the reverse direction so as to retract the slide 62 and template 61 back to the starting position.

During the return template motion the stylus permits the tracer valve spool 125 to shift in the direction indicated by the arrow H (FIG. 16) thus shifting the tool slide, cylinder assembly and tracer valve, as a unit, in the retracting direction, as indicated by the arrow J in FIG. 16 for the start of a new tool feed cycle.

During the retracting movement of the template (FIGS. 13 and 16), with the valve spool 125 shifted toward the right (arrow H), fluid pressure is introduced into the rearward end of the cylinder 66 through tracer valve 64 by way of pressure conduit 138, passageway 137, central groove 135, port 136, central necked portion 126 and to right port 134, which is now uncovered by land 130. From right port 134 pressure is introduced by way of conduit 147 (FIG. 16) to the retracting end of cylinder 66 rearwardly of its piston 175. Fluid is exhausted from the end of cylinder 66 forwardly of piston 175 by way of conduit 146, port 144, annular groove 139, left port 133 (uncovered by land 129), left neck 127, port 132 to the bore 131 of sleeve 125. From bore 131, the exhaust fluid flows by way of chamber 142 and exhaust conduit 143 back to the sump of the hydraulic supply unit.

TOOL SLIDE ASSEMBLY

The tool slide assembly 67, as noted earlier, comprises upper and lower slides carrying opposed cutting tools which are presented to diametrically opposite sides of the rotating workpiece. In the present example (FIGS. 3, 8 and 9) the tool slides are arranged in upper and lower pairs located at opposite sides of the chuck 8, the pairs of opposed tool slides being shifted in unison by respective rack and pinion units 177, as described later in detail.

The upper tool slide assembly comprises two sections 178—178 located on opposite sides of the chuck 8 and moveable in unison and in the same direction. Each upper tool slide 178 is slideably carried within a slide way 180 (FIG. 3) formed in the housing 4, the two slides being mounted in side-by-side relationship.

The lower tool slide unit consists of a pair of slides 181—181, also located on opposite sides of the chuck 8 (FIG. 3). Each lower tool slide 181 is slideably mounted in a slide way 182 formed in a casting 183 which is attached to the base 1. In the following detailed description, the upper tool slides 178 and the lower tool slides 181 are described in the singular since the pairs of upper and lower slides are in duplicate.

Described in detail, each upper tool slide 178 (FIGS. 3, 8 and 9) comprises a slide block having opposed slide rails 184—184 projecting inwardly toward one another along its upper portion. The rails 184 slideably interfit a pair of opposed slots formed in the lower surface of housing 4. The cutting tools 16 are carried by tool holders 185 attached to the lower surface of the tool slide 178.

Figure 9:
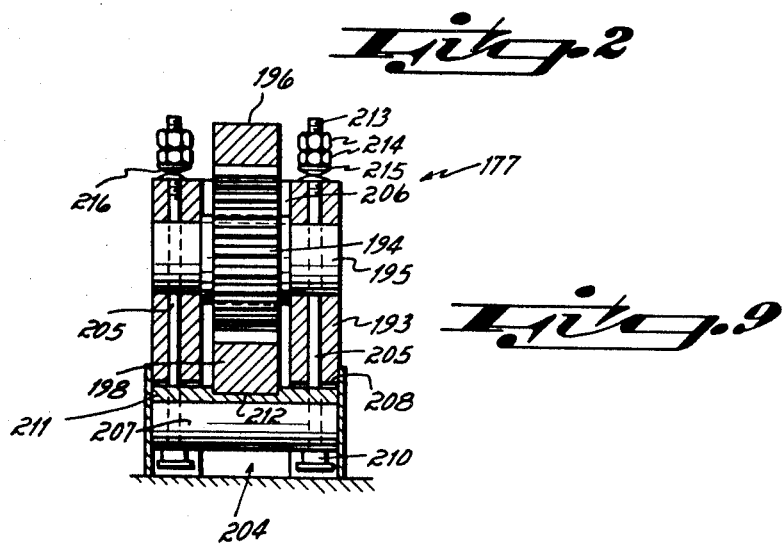
FIG. 9 is a sectional view taken along line 9—9 of FIG. 8 further detailing the rack and pinion drive unit, particularly the anti-backlash mechanism.

Each lower tool slide 181 is similar in construction to the upper slide. As shown in FIGS. 3, 8 and 9, each lower tool slide 181 includes a pair of opposed slide rails 186—186 attached to the tool slide 181 along opposite sides and engaged in the slideways 182 formed in opposite sides of a casting 183 secured to the base 1 of the machine. The cutting tools 16 of the lower tool slide 181 are carried by tool holders 185 which are attached to the upper surface of the lower tool slide 181.

As noted earlier, the piston rod 176 of cylinder 66 (FIG. 8) is anchored to a portion of the housing 4, the end of the piston rod being threaded as at 190, such that cylinder 66 shifts relative to housing 4 during the feeding and retracting movements. As viewed in FIGS. 2 and 3, the cylinder 66 is connected to both upper tool slides 178—178 by a bridge 191, such that both upper tool slides shift in unison with one another in response to movements of cylinder 66 under hydraulic tracer control.

In order to shift the opposed upper and lower tool slides 178 and 181 in unison with one another, the upper and lower tool slide of each pair are interconnected with one another by the pair of rack and pinion units 177—177, as described in detail below. It will be understood at this point that two rack and pinion units 177 are utilized in the present example, one for each companion set of upper and lower tool slides 178 and 181. Since the rack and pinion units are in duplicate, the following description is made with reference to one of the units, as shown in FIGS. 8 and 9.

Each rack and pinion unit 177 is enclosed in a gear box 193, the two gear boxes 193 being secured to the base 1 of the lathe in spaced relationship, as shown in FIG. 2. Each gear box includes a pinion 194 (FIG. 8) journalled upon a stationary cross shaft 195 mounted within the gear box 193. The opposed feeding motion is imparted to the upper and lower slides by respective racks meshing with pinion 194. Thus, the upper tool slide 178 includes a rack 196 carried by a block 197 secured to the upper slide 178.

The lower slide 181 is actuated by a rack 198 meshing with the opposite side of pinion 194. Rack 198 includes a shank 200 projecting outwardly through gear box 193. A connecting rod 201 projecting from lower tool slide 181 is adjustably connected to shank 200 by the screw threads 202. Each gear box 193 is rigidly attached to bed 1 by screws 203.

In order to eliminate backlash in the rack and pinion units 17, which interconnect the upper and lower tool slides, each rack and pinion unit 177 is provided with an anti-backlash device indicated generally at 204 (FIGS. 8 and 9). This device urges the upper and lower racks 196 and 198 into engagement with the opposite sides of pinion 194 under predetermined pressure and thereby eliminates any looseness between the rack and pinion teeth Described in detail, each anti-backlash device 204 comprises a pair of tension bolts 205—205 passing downwardly through the top wall 206 of the gear box 193, the structure for each box being duplicated. The lower end of each tension bolt 205 passes through a cross bar 207 having opposite ends slideably confined within slots 208—208 formed in the lower side walls of gear box 193. The lower ends of the tension bolts include heads 210 which engage the lower surface of cross bar 207 at opposite ends. The upper surface of cross bar 207 includes a shoe 211 having a flat bearing surface 212 in bearing engagement with the lower surface of the lower rack 198. The tension bolts 205 pass upwardly through the stationary cross shaft 195 and the upper end portions of the bolts are threaded as at 213 to receive the adjustment nuts 214. Each tension bolt includes a flat washer 215 seated upon one or more corrugated spring washers 216 interposed in compression between washer 215 and the top wall 206 of gear box 193.

In order to take up the backlash, cross shaft 195 is free to float slightly in the vertical plane relative to the gear box 193. In setting up the machine, the adjustment nuts 214 are tightened to a predetermined setting, thus forcing the lower rack into meshing engagement with the pinion 194, adapting the pinion to be forced upwardly into meshing engagement with the upper rack 196.

In order to locate the two cutting tools at precisely equal distances with reference to the axis of work rotation 15, the relative positions of the upper and lower tool slides may be adjusted relative to one another. For this purpose, the lower slide may be adjusted relative to its rack through the screw threaded engagement 202 between the connecting rod 201 and shank 200 and locked in adjusted position by the nut 217. An adjustment means (not shown) is provided for the upper slide 178.

As noted earlier, at completion of the feed stroke, the upper slide 178 is engaged against a positive stop 174 (FIGS. 8 and 15) at which point the opposed tools will have reached their final position. The tools remain in this position for the final finishing or sizing operation, both the upper and lower slides being precisely located by the stop by virtue of the anti-backlash device 177. The stop 174 is located in the slideway 180 of the upper tool slide 178 and may be adjusted by means not shown.

The general arrangement of the pairs of upper and lower tool slides 178 and 181 is shown diagrammatically in FIG. 7. As noted earlier, the cutting tools 16 of each pair of opposed tool slides are arranged to generate cuts in the workpiece which overlap one another as at 19 on opposite sides of the workpiece to avoid longitudinal tool travel. It will be understood that the tools are precisely set with reference to the diameter of the workpiece so as to finish the diameters uniformly.

CONTROL SYSTEM

As previously mentioned, the various components of the crankshaft lathe are under control of an electrical circuit arranged to operate a hydraulic control system which actuates the components of the machine. A control system suitable for this purpose is illustrated diagrammatically in FIG. 17, the circuit being simplified in order to bring out only those portions which are relevant to the invention. The control system does not form an essential part of the invention and may be of conventional design other than that illustrated.

Referring to the schematic diagram (FIG. 17) the box labeled "Main Control Circuit" represents the electrical control circuit which regulates the operation of the several hydraulic components. The main control circuit includes the various transformers, relays, electrical interlocks and the like which provide the necessary sequence in the operation of the tracer apparatus 6 and the regulation of the speed change transmission unit 12. The diagram also illustrates, in a general way, the electrical and hydraulic circuit by means of which the template 61 is retracted at a rapid traverse rate back to its starting position at the end of a tool feeding cycle (hydraulic traverse motor 90).

As noted earlier, the lathe may be controlled automatically to carry out the sequence of operations, such as loading and unloading, chucking, tool feeding and retraction and other necessary functions in proper sequence. These operations may also be carried out manually by operation of the push buttons of the control console 9 which is interconnected with the main control circuit and is arranged to initiate the sequence of operations. In the diagram, the template 61 is shown in an intermediate position of a feed cycle during which the main bearings of the crankshaft 7 are being machined.

It will be understood that, for simplicity, the template, its limit switches, trip dogs and other components are diagrammed in relative positions best suited to disclose the sequence of tracer functions. Other arrangements of limit switches, trip dogs and electrical circuits may be utilized for the same purpose.

As shown in the diagram, the template slide includes a final limit switch 218 which is tripped by a dog 220 at the final limit of template travel. Final limit switch 218 is connected by way of the electrical leads 221 and 222 with the main control circuit which, in turn, controls the clutches of the speed change transmission unit 12. When final limit switch 218 is tripped, the main motor 10 continues running with the low speed clutch engaged for the sizing operation. After a predetermined time interval for the sizing operation, as provided by the main control circuit, a new feed cycle is initiated.

As shown in the diagram, the entire electrical circuit is energized by the power lines 223 and the circuit includes suitable relays for energizing the main motor 10 by way of the power lines 219. In order to supply hydraulic power, the motor 225 of the hydraulic pump 226 normally is energized by the power lines 227 from the control circuit while the system is in operation.

It will be understood that the duration of the tool dwell period (sizing) is regulated by the control circuit and that when the circuit times out the main motor 10 may be deenergized. Alternatively, a clutch (not shown) may be utilized to disengage the motor with respect to the transmission unit 12. The driving head 38 of the chuck is brought to its final position for loading and unloading the workpieces (arms 13 and 14) under the control of the timing device 22 (not shown in the diagram). At the final drive head position, with the radial slot 39 in upright position (FIGS. 4 and 7) a brake 224 on counter shaft 241 of transmission unit 12 may be energized to hold the driving head 38 in the loading position. A suitable brake control circuit is illustrated in the diagram and is described later.

During the dwell period an electrical signal is sent to the main control circuit from the traverse control switch 91 which will have been tripped at the end of the feed cycle (FIG. 10) along with final limit switch 218. Traverse switch 91 is connected to the main control circuit by way of the leads 230. Upon receiving the traverse signal (switch 91) and after a predetermined time period, the control circuit times out then energizes a traverse solenoid 234 by way of leads 235. When traverse solenoid 234 is energized, the rapid traverse or template retracting motor 90 is energized, thereby to retract the template 61 back to its starting position.

For this purpose, a hydraulic system (shown in simplified form) as a hydraulic conduit 231, extends from the hydraulic pump 226 and to the several hydraulically operated components of the apparatus, including the hydraulic traverse motor 90. The hydraulic traverse motor is energized by the hydraulic branch conduit 323 extending from the main conduit 231 with a hydraulic valve 233 interposed in the branch conduit 232. Hydraulic valve 233 is operated by the solenoid 234 mechanically connected to valve 233 and interconnected with the control circuit by way of the electrical leads 235.

When the control circuit energizes solenoid 234, hydraulic pressure is transmitted to traverse motor 90 by way of conduit 232 through the motor and is exhausted from motor 90 by way of conduit 236 to the sump 237. The sump 237 represents the main reservoir of the hydraulic supply unit (motor 225 and pump 226), the same sump being indicated at different points in the diagram for simplification.

After the template 61 has been shifted back to its fully retracted position (with the cutting tools retracted from the work) the traverse control switch 91 signals the control circuit (leads 230) to de-energize the hydraulic traverse motor 90. At this point the limit switch 72 will be tripped by its template dog 75 to condition the control circuit for the next feed cycle.

Limit switch 72 is connected to the control circuit by way of the leads 222 and 238 and, upon being tripped, disengages the low speed clutch of transmission 12 and engages the high speed clutch 147. This operation provides the traverse motion in tool feed direction as previously described, during which the opposed cutting tools are fed in at the rapid traverse rate from their retracted to their rough cutting position with reference to the workpiece.

It will be noted at this point that the speed change transmission unit includes an input shaft 240 and a counter shaft 241 common to output shaft 18, the main motor being connected to the input shaft 240 by way of the belt and pulley system 11. The output shaft 18 and 241 includes the output pinion 20, previously described, which drives the chuck and tracer apparatus at related speeds.

The input shaft 240 and output shaft 241 include the constant mesh gear trains comprising the medium speed train 243, the high sped train 244 and the low speed train 245. These trains are coupled to the counter shaft 241 and its output pinion 20 by the three clutches consisting of the medium speed clutch 246, the high speed clutch 247 and the low speed clutch 248.

As the template dog 75 trips switch 72 at fully retracted position and switch 72 signals the control circuit to engage the high speed clutch 247 (leads 222 and 238), high speed clutch 247 is engaged hydraulically by operation of a valve 251. Valve 251 is connected to the main hydraulic conduit 231 by way of a branch conduit 252. Valve 251 is opened by a solenoid 253 which is energized through the control circuit by way of electrical leads 248 and 249. Several speed control solenoids are connected in common to the branch line 249. It will be understood at this point that the remaining clutches and the brake 224 are disengaged when the high speed clutch 247 is commissioned.

After completion of the template and tool in-feed, traverse motion (template section D) limit switch 71 it tripped by its dog 74 to disengage the high speed clutch 247 and to engage the medium speed clutch 246 for medium feed cutting. The stylus traverses template section F during this portion of the cycle.

Medium speed clutch 246 is engaged by way of the leads 222 and 255 from switch 71 to the control circuit and by way of the leads 256 and 249 from the control circuit to the solenoid 257 of valve 258. The valve 258 is interconnected with the main hydraulic conduit by way of branch conduit 260.

At completion of the medium tool feed (clutch 246) during which the cutting tools are presented to the work for the first portion of the cutting cycle, limit switch 70 is tripped by its dog 73. This switch is interconnected with the control circuit by way of leads 262 and 222. At this point, the control circuit disengages medium clutch 246 and engages the low speed clutch 248 (gear train 245) so as to drive the chuck and workpiece at the low speed which is related to the fine feed section G of the template.

The circuit to the low speed clutch 248 is completed from the main control circuit by way of the leads 249 and 261 to the low speed solenoid 265 of valve 266. Valve 266 is interconnected with the hydraulic system by way of the branch conduit 267. Upon being energized, solenoid 265 opens valve 266 and engages the low speed clutch, the medium speed and high speed clutches previously having been disengaged, as noted above.

The workpiece is driven at the low speed rate during the final cutting operation and during the sizing operation at which point the upper tool slide will have engaged the positive stop 174 (FIG. 15). The control circuit includes suitable components to maintain this circuit for a predetermined time for the final sizing operation, as noted above, with the tools dwelling against the opposite sides of the rotating workpiece. The operating cycle is then terminated for unloading the finished workpiece and loading in a rough one.

As noted above, the timing device 22 determines the final position of the driving head 38 of the clutch for the unloading and loading operation. In the example illustrated, the brake 224 of the transmission unit 12 is applied at this point with the power drive to the transmission decommissioned. At the final positioning point, on signal from the main control circuit, a brake solenoid 268 is energized by way of the electrical leads 270 of the control circuit.

Upon being energized, solenoid 268 opens a valve 271 which admits fluid pressure from the hydraulic system by way of branch conduit 272 to the hydraulically operated brake 224 of counter shaft 241. The brake 224 may be combined with an inching circuit (not shown) arranged to inch the transmission unit to a stop with the driving head properly oriented. After the loading and unloading operation, the control circuit signals solenoid 268 to release the brake for the next cutting cycle.

As shown in the diagram, hydraulic fluid pressure is supplied to the tracer valve 64 by way of the branch conduit 138 (previously noted) from pump 226 and conduit 231. Hydraulic fluid is conducted to the feed cylinder by way of the conduits 146 and 147, as described earlier with reference to FIGS. 14 and 15. Fluid is exhausted from the tracer valve by way of the conduit 143 back to the sump 237.

Having described my invention, I claim:

1. A fluid pressure tracer apparatus for feeding and retracting the tool slide and cutting tool of a lathe, said lathe having power transmission means for rotating a workpiece, a tool slide for mounting a cutting tool, and a slideway along which the tool slide and cutting tool may be fed relative to the axis of rotation of the workpiece, said tracer apparatus comprising:

a fluid pressure motor carried by the lathe and mechanically connected to said tool slide for feeding the tool slide and cutting tool along a path of travel which is angularly related to the axis of rotation of the workpiece;

a tracer valve having a stylus, said tracer valve being interconnected with the fluid pressure motor and arranged to energize the motor in forward and reverse directions in response to the deflections of the stylus;

said tracer valve being mechanically connected to the tool slide for movement in unison therewith;

a template having a profile presented to the stylus of the tracer valve, said template being mounted for movement relative to the stylus of the tracer valve, thereby to deflect the stylus and to energize the fluid pressure motor in forward and reverse directions in response to the deflections of the stylus by the action of the profile of the moving template relative to the stylus;

driving means for moving the template relative to the stylus of the tracer valve, said driving means being interconnected with the transmission means which is in driving connection with the workpiece, whereby the tracer apparatus generates a tool feed motion for feeding the tool slide and the tool angularly relative to the axis of rotation of the workpiece at a rate which is related to the speed of rotation of the workpiece;

the profile of the template, which is presented to the stylus of the tracer valve, having a final limit tool feed slope;

and a rapid traverse template retracting motor interconnected with the template driving means said lathe having means for energizing said rapid traverse retracting motor independently of the template driving means as the final limit of tool feed slope is presented to the stylus, thereby to retract the template from the final limit of tool feed motion back to a starting position.

2. A fluid pressure tracer apparatus for feeding and retracting the tool slide and cutting tool of a lathe, said lathe having power transmission means for rotating a workpiece, a tool slide for mounting a cutting tool, and a slideway along which the tool slide and cutting tool may be fed relative to the axis of rotation of the workpiece, said tracer apparatus comprising:

a fluid pressure motor carried by the lathe and mechanically connected to the said tool slide for feeding the tool slide and cutting tool along a path of travel which is angularly related to the axis of rotation of the workpiece;

a tracer valve having a stylus, said tracer valve being interconnected with the fluid pressure motor and arranged to energize the motor in forward and reverse directions in response to the deflections of the stylus;

said tracer valve being mechanically connected to the tool slide for movement in unison therewith;

a template having a profile presented to the stylus of the tracer valve, said template being mounted for movement relative to the stylus of the tracer valve, thereby to deflect the stylus and to energize the fluid pressure motor in forward and reverse directions in response to the deflections of the stylus by the action of the profile of the moving template relative to the stylus;

driving means for moving the template relative to the stylus of the tracer valve, said driving means being interconnected wtih the transmission means which is in driving connection with the workpiece, whereby the tracer apparatus generates a tool feed motion for feeding the tool slide and the tool angularly relative to the axis of rotation of the workpiece at a rate which is related to the speed of rotation of the workpiece;

and a variable speed driving system interconnecting the template driving means with the power transmission means which rotates the workpiece;

the said variable speed driving means including manual means, whereby the driving ratio between the transmission means and the template driving means may be varied to change the feed rate of the cutting tool in relation to the speed of rotation of the workpiece.

3. A tracer controlled lathe, said lathe having power transmission means for rotating a workpiece, a tool slide for mounting a cutting tool, and a slideway along which the tool slide and cutting tool may be fed relative to the axis of rotation of the workpiece, said tracer controlled lathe comprising:

a fluid pressure motor carried by the lathe and mechanically connected to the said tool slide for feeding the tool slide and cutting tool along a path of travel which is angularly related to the axis of rotation of the workpiece;

a tracer valve having a stylus, said tracer valve being interconnected with the fluid pressure motor and arranged to energize the motor in forward and reverse directions in response to the deflections of the stylus;

said tracer valve being mechanically connected to the tool slide for movement in unison therewith;

a template having a profile presented to the stylus of the tracer valve, said template being mounted for movement relative to the stylus of the tracer valve, thereby to deflect the stylus and to energize the fluid pressure motor in forward and reverse directions in response to the deflections of the stylus by the action of the profile of the moving template relative to the stylus;

driving means for moving the template relative to the stylus of the tracer valve, said driving means being interconnected with the transmission means which is in driving connection with the workpiece, whereby the tracer apparatus generates a tool feed motion for feeding the tool slide and the tool angularly relative to the axis of rotation of the workpiece at a rate which is related to the speed of rotation of the workpiece;

said power transmission means having speed change elements for changing the speed of rotation of the workpiece;

and control means connected to the template for successively actuating the speed change elements of the transmission means for changing the speed of the transmission means, thereby to rotate the workpiece at a rate approaching a constant cutting speed as the diameter of the workpiece decreases.

4. A template controlled feed mechanism for feeding and retracting the cutting tool of a lathe, said lathe having power transmission means for rotating a workpiece, a tool slide for mounting a cutting tool and a slideway along which the tool slide and cutting tool may be fed relative to the axis of rotation of the workpiece, a fluid pressure tracer apparatus for feeding the tool slide and cutting tool along a path of travel which is angularly related to the axis of rotation of the workpiece, said template controlled feed mechanism comprising:

a fluid pressure motor carried by the lathe and mechanically connected to the said tool slide for feeding the tool slide and cutting tool along a path of travel which is angularly related to the axis of rotation of the workpiece;

a tracer valve having a stylus, said tracer valve being interconnected with the fluid pressure motor and arranged to energize the motor in forward and reverse directions in response to the deflections of the stylus;

said tracer valve being mechanically connected to the tool slide for movement in unison therewith;

a template having a profile presented to the stylus of the tracer valve, said template being mounted for movement relative to the stylus of the tracer valve, thereby to deflect the stylus and to energize the fluid pressure motor in forward and reverse directions in response to the deflections of the stylus by the action of the profile of the moving template relative to the stylus;

driving means for moving the template relative to the stylus of the tracer valve, said driving means being interconnected with the transmission means which is in driving connection with the workpiece, whereby the tracer apparatus generates a tool feed motion for feeding the tool slide and the tool angularly relative to the axis of rotation of the workpiece at a rate which is related to the speed of rotation of the workpiece;

said template driving means having a screw shaft;

the template being in threaded connection with the screw shaft;

said template driving means connecting the screw shaft with the power transmission means of the lathe, whereby the template is advanced relative to the stylus of the tracer valve at a rate which is related to the rate of rotation which is imparted to the workpiece by the transmission means.

5. A template controlled feed mechanism for feeding and retracting the cutting tool of a lathe, said lathe having power transmission means for rotating a workpiece, a tool slide for mounting a cutting tool and a slideway along which the tool slide and cutting tool may be fed relative to the axis of rotation of the workpiece, a fluid pressure tracer aparatus for feeding the tool slide and cutting tool along a path of travel which is angularly related to the axis of rotation of the workpiece, said template controlled feed mechanism comprising:

a fluid pressure motor carried by the lathe and mechanically connected to the said tool slide for feeding the tool slide and cutting tool along a path of travel which is angularly related to the axis of rotation of the workpiece;

a tracer valve having a stylus, said tracer valve being interconnected to the fluid pressure motor and arranged to energize the motor in forward and reverse directions in response to the deflections of the stylus;

said tracer valve being mechanically connected to the tool slide for movement in unison therewith;

a template having a profile presented to the stylus of the tracer valve, said template being mounted for movement relative to the stylus of the tracer valve, thereby to deflect the stylus and to energize the fluid pressure motor in forward and reverse directions in response to the deflections of the stylus by the action of the profile of the moving template relative to the stylus;

driving means for moving the template relative to the stylus of the tracer valve, said driving means being interconnected with the transmission means which is in driving connection with the workpiece, whereby the tracer apparatus generates a tool feed motion for feeding the tool slide and the tool angularly relative to the axis of rotation of the workpiece at a rate which is related to the speed of rotation of the workpiece;

said template driving means having a screw shaft;

a template slide in threaded connection with the screw shaft;

means connecting the template to the template slide;

the lathe having a slideway which is traversed by the template slide;

said template driving means connecting the screw shaft with the power transmission means of the lathe, whereby the template slide and template, as a unit, is advanced relative to the stylus of the tracer valve at a rate which is related to the rate of rotation which is imparted to the workpiece by the transmission means.

6. In a lathe having a power driven speed change transmission unit for rotating a workpiece about a work axis, a tool slide for mounting a cutting tool, and a slideway along which the tool slide and tool may be advanced and retracted with respect to the axis of rotation of the workpiece, a fluid pressure tracer apparatus for feeding and retracting the tool slide and tool with reference to the axis of rotation of the workpiece, said tracer apparatus comprising:

a reversible fluid pressure motor carried by the lathe and connected mechanically to the said tool slide for feeding and retracting the tool slide and cutting tool relative to the axis of rotation of the workpiece;

a fluid pressure tracer valve having a stylus, said valve interconnected with the reversible fluid pressure motor for supplying fluid pressure to the motor for operation of the motor in forward and reverse directions, thereby to advance and retract the tool slide and cutting tool relative to the axis of rotation of the workpiece by servo motion in response to deflections of the stylus;

said tracer valve being interconnected mechanically with the tool slide for movement in unison therewith;

a template having a profile which is presented to the stylus of the tracer valve, said template mounted for movement relative to the stylus of the tracer valve, thereby the template deflects the stylus and energizes the reversible fluid motor in forward and reverse directions in response to changes in the profile of the moving template to generate the tool feeding and retracting motions which are imparted by the reversible hydraulic motor to the tool slide and cutting tool;

template driving means interconnecting the template and speed change transmission unit for advancing the template in tool feeding direction with respect to the stylus of the tracer valve at a predetermined rate which is related to the speed of rotation which is imparted by the speed change transmission unit to the workpiece;

and template retracting power means interconnected with the template driving means, said retracting power means arranged to drive the template driving means in a template retracting direction upon energization thereof from a final tool feed position back to a starting position, the tracer apparatus thereby adapted to retract the tool slide and cutting tool from a final cutting position back to a starting position relative to the axis of the workpiece.

7. In a lathe having power transmission means for rotating the workpiece, upper and lower opposed tool slides for mounting respective opposed cutting tools, upper and lower slideways along which the tool slides and cutting tools may be fed in opposite directions relative to the axis of rotation of the workpiece, and a tracer apparatus including a fluid pressure motor and tracer valve for feeding the tool slides and cutting tools along a path of travel angularly related to the axis of rotation of the workpiece, an anti-backlash device for moving said opposed tool slides and cutting tools in opposite directions and in unison with one another, said anti-backlash device comprising:

an anti-backlash housing carried by the lathe;
a pinion rotatably mounted within said housing and movable in a vertical plane;
respective racks connected to the said upper and lower tool slides and in meshing engagement with said pinion on opposite sides;
yieldable means slideably engaging said upper and lower racks on opposite sides and urging the racks into engagement with the pinion on opposite sides, said yieldable means arranged to urge the upper and lower racks into engagement with said pinion to eliminate clearance between the teeth of the upper and lower racks and pinion.

8. In a lathe having power transmission means for rotating the workpiece, upper and lower opposed tool slides for mounting respective opposed cutting tools, upper and lower slideways along which the tool slides and cutting tools may be fed in opposite directions relative to the axis of rotation of the workpiece, and a tracer apparatus including a fluid pressure motor and tracer valve for feeding the tool slides and cutting tools along a path of travel angularly related to the axis of rotation of the workpiece, an anti-backlash device for moving said opposed tool slides and cutting tools in opposite directions and in unison with one another, said anti-backlash device comprising:

an anti-backlash housing carried by the lathe;
a pinion rotatably mounted within said housing and movable in a horizontal plane;
respective racks connected to the said upper and lower tool slides and in meshing engagement with said pinion on opposite sides;

a cross bar mounted for vertical movement within said housing;
a shoe carried by said cross bar slideably engaging the lower surface of the rack which is connected to the lower tool slide;
a slide block mounted in said housing and slideably engaged against the upper surface of the rack which is connected to the upper tool slide;
a pair of tension elements connected to said cross bar;
and spring elements connected to the tension elements and arranged to draw the said cross bar and shoe upwardly to urge the upper and lower racks into engagement with said pinion, thereby to eliminate clearance between the teeth of the upper and lower racks and pinion.

9. In a lathe having power transmission means for rotating a workpiece, a tool slide for mounting a cutting tool, and a slideway along which the tool slide and tool may be fed relative to the axis of rotation of the workpiece, a fluid pressure tracer apparatus for feeding the tool slide and cutting tool along a path of travel which is angularly related to the axis of the rotation of the workpiece; said tracer control apparatus comprising:

a fluid pressure motor carried by the lathe and mechanically connected to the said tool slide for feeding the tool slide and cutting tool relative to the axis of rotation of the workpiece;
a tracer valve having a stylus, said tracer valve being interconnected with the fluid pressure motor and arranged to energize the motor in forward and reverse directions in response to the deflections of the stylus;
said tracer valve being mechanically connected to the tool slide for movement in unison therewith;
a template having a profile presented to the stylus of the tracer valve, said template being mounted for movement relative to the stylus of the tracer valve, thereby to deflect the stylus and to energize the fluid pressure motor in forward and reverse directions in response to the deflections of the stylus by the action of the profile of the moving template relative to the stylus;
driving means for moving the template relative to the stylus of the tracer valve, said driving means being interconnected with the transmission means which is in driving connection with the workpiece, whereby the tracer apparatus generates a tool feed motion for feeding the tool slide and the tool angularly relative to the axis of rotation of the workpiece at a rate which is related to the speed of rotation of the workpiece;
a final limit tool feed slope on said template;
said lathe having means for retracting the template independently of the template driving means as the final limit tool feed slope is presented to the stylus, thereby to retract the template from the final limit of tool feed motion back to a starting position.

References Cited
UNITED STATES PATENTS

| | | | |
|---|---|---|---|
| 2,436,258 | 2/1948 | Haynes | 82—24 |
| 2,531,340 | 11/1950 | Mathys | 51—100 |
| 2,656,752 | 10/1953 | Kurzweil | 82—24 |
| 2,896,490 | 7/1958 | Von Zelewsky | 82—14 |
| 2,900,860 | 8/1959 | Lomazzo | 82—24 |
| 3,069,948 | 12/1962 | Le Brusque | 82—21 |
| 3,246,568 | 4/1966 | Hurth | 90—1.6 |
| 3,262,647 | 7/1966 | Harrison | 82—14 |

GERALD A. DOST, Primary Examiner

U.S. Cl. X.R.

82—24

UNITED STATES PATENT OFFICE
CERTIFICATE OF CORRECTION

Patent No. 3,516,309    Dated June 23, 1970

Inventor(s) Otto Hermann

It is certified that error appears in the above-identified patent and that said Letters Patent are hereby corrected as shown below:

Column 9, lines 14 and 15, after "tangent of the" delete "templete profile at a rate equal to the tangent of the"

Column 9, line 30, change "at" to -- as --

Column 11, line 36, change "8" to -- 78 --

Column 13, line 11, change "3" to -- 13 --

Column 15, line 69, change "17" to -- 177 --

Column 18, line 35, change "sped" to -- speed --

Column 18, line 69, after "disengages medium" insert -- speed --

Column 20, line 45, change "wtih" to -- with --

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents

FORM PO-1050 (10-69)